(12) United States Patent
Raudat et al.

(10) Patent No.: US 7,552,570 B2
(45) Date of Patent: Jun. 30, 2009

(54) PACKAGING MACHINE

(75) Inventors: John L. Raudat, Kalispell, MT (US); J. Michael Weaver, Madison, CT (US); Rick Dolce, East Hampton, CT (US); Jeffrey Reilly, Killingworth, CT (US); Lloyd Johnson, Portland, CT (US); Vincent M. Cassarino, South Meriden, CT (US)

(73) Assignee: Standard Knapp Inc., Portland, CT (US)

( * ) Notice: Subject to any disclaimer, the term of this patent is extended or adjusted under 35 U.S.C. 154(b) by 0 days.

(21) Appl. No.: 11/068,427

(22) Filed: Feb. 28, 2005

(65) Prior Publication Data

US 2005/0229539 A1    Oct. 20, 2005

Related U.S. Application Data

(60) Provisional application No. 60/548,763, filed on Feb. 27, 2004.

(51) Int. Cl.
*B65B 5/06* (2006.01)

(52) U.S. Cl. .............................. 53/246; 53/235; 53/244; 53/247; 53/250; 53/534; 53/539

(58) Field of Classification Search ........... 53/443–444, 53/473, 475, 147–148, 158, 531, 534–536, 53/48.1, 49, 539, 235–236, 244–251
See application file for complete search history.

(56) References Cited

U.S. PATENT DOCUMENTS

| 2,656,081 | A |   | 10/1953 | Davis ........................... 226/14 |
| 3,553,932 | A | * | 1/1971 | Rowekamp .................. 53/539 |
| 3,601,951 | A |   | 8/1971 | Bargel et al. .................... 53/61 |
| 4,294,057 | A | * | 10/1981 | Winiasz et al. ................ 53/244 |
| 4,457,121 | A |   | 7/1984 | Johnson et al. ................. 53/56 |
| 5,065,856 | A |   | 11/1991 | Reid et al. ............... 198/419.3 |
| 5,069,016 | A | * | 12/1991 | Grossi .......................... 53/398 |
| 5,212,930 | A | * | 5/1993 | Raudat ......................... 53/263 |
| 5,588,282 | A | * | 12/1996 | Hartness ....................... 53/473 |
| 5,737,902 | A | * | 4/1998 | Aylward ....................... 53/475 |
| 5,797,249 | A | * | 8/1998 | Hartness ....................... 53/473 |
| 6,612,095 | B2 |   | 9/2003 | Hartness ....................... 53/247 |
| 6,722,101 | B2 |   | 4/2004 | Hartness et al. ............... 53/247 |
| 6,729,103 | B1 | * | 5/2004 | Hartness et al. ............... 53/247 |

\* cited by examiner

OTHER PUBLICATIONS

PCT—Notification of Transmittal of the International Search Report and the Written Opinion of the International Searching Authority or the Declaration, mailed Sep. 26, 2005.

*Primary Examiner*—Christopher Harmon
(74) *Attorney, Agent, or Firm*—Cantor Colburn LLP

(57) ABSTRACT

A packaging machine includes a grouper section having changeable lane sizes and a dual servo grouper that separates product into product sets and allow the product sets to accelerate to the lane chain speed in a controlled manner. The grouper section further includes disappearing lugs that pivot into the lanes via a cam surface provided in the lanes. The product rides upon a raised surface of the cam surface as the lug pushes the product set together down the lane, thus ensuring that no gaps are provided between product set members. A gripper/grid section of the packaging machine includes a bars that travel about a carousel with a gripper head assembly and a grid assembly pair moving up and down the bars as defined by cam surfaces within the gripper/grid section. The grid section is presented below the product set such that the product set is fed through the grid section in a one-way trip into a case. The gripper head assembly cam device and the case feed section both include height adjustment assemblies.

10 Claims, 14 Drawing Sheets

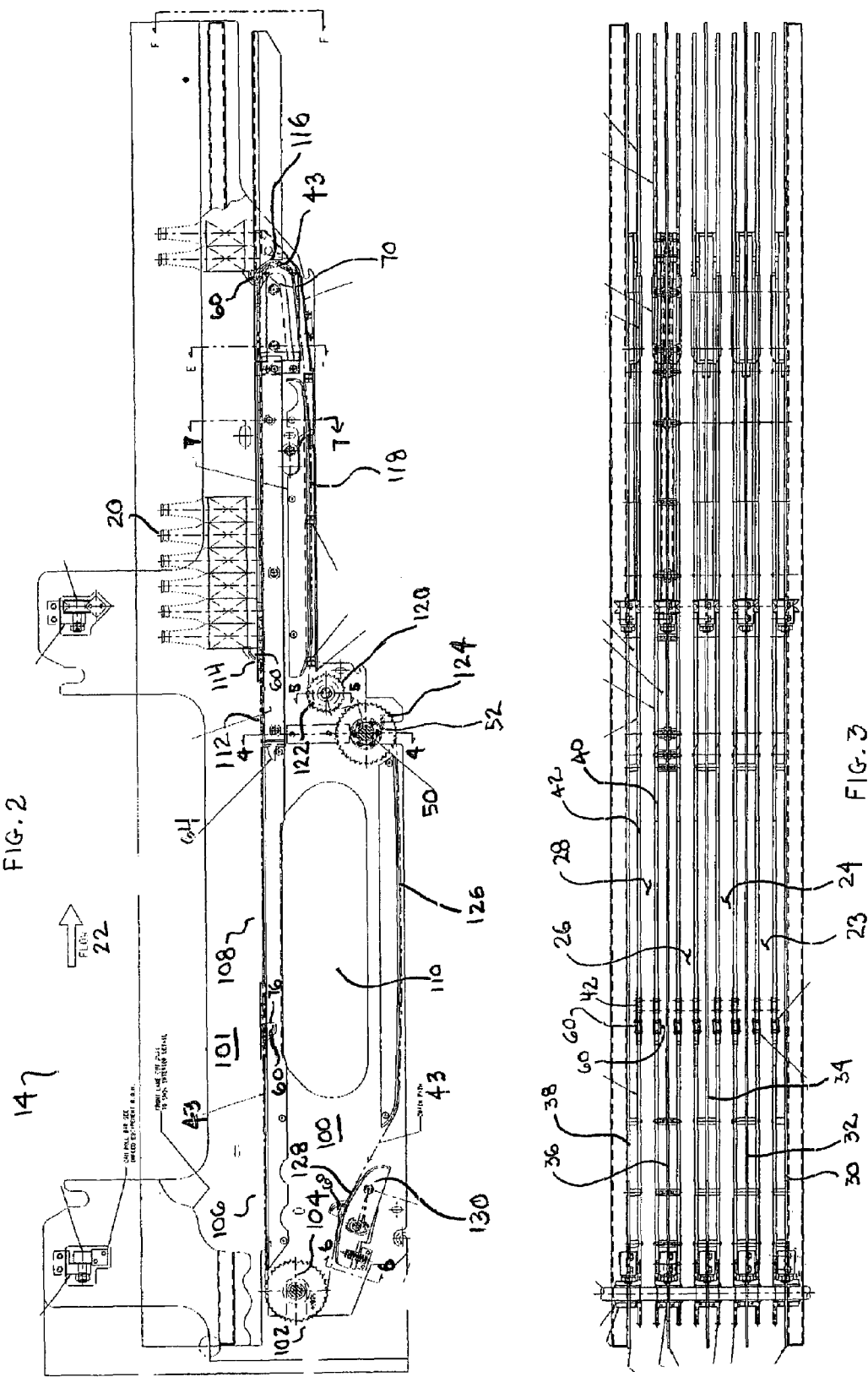

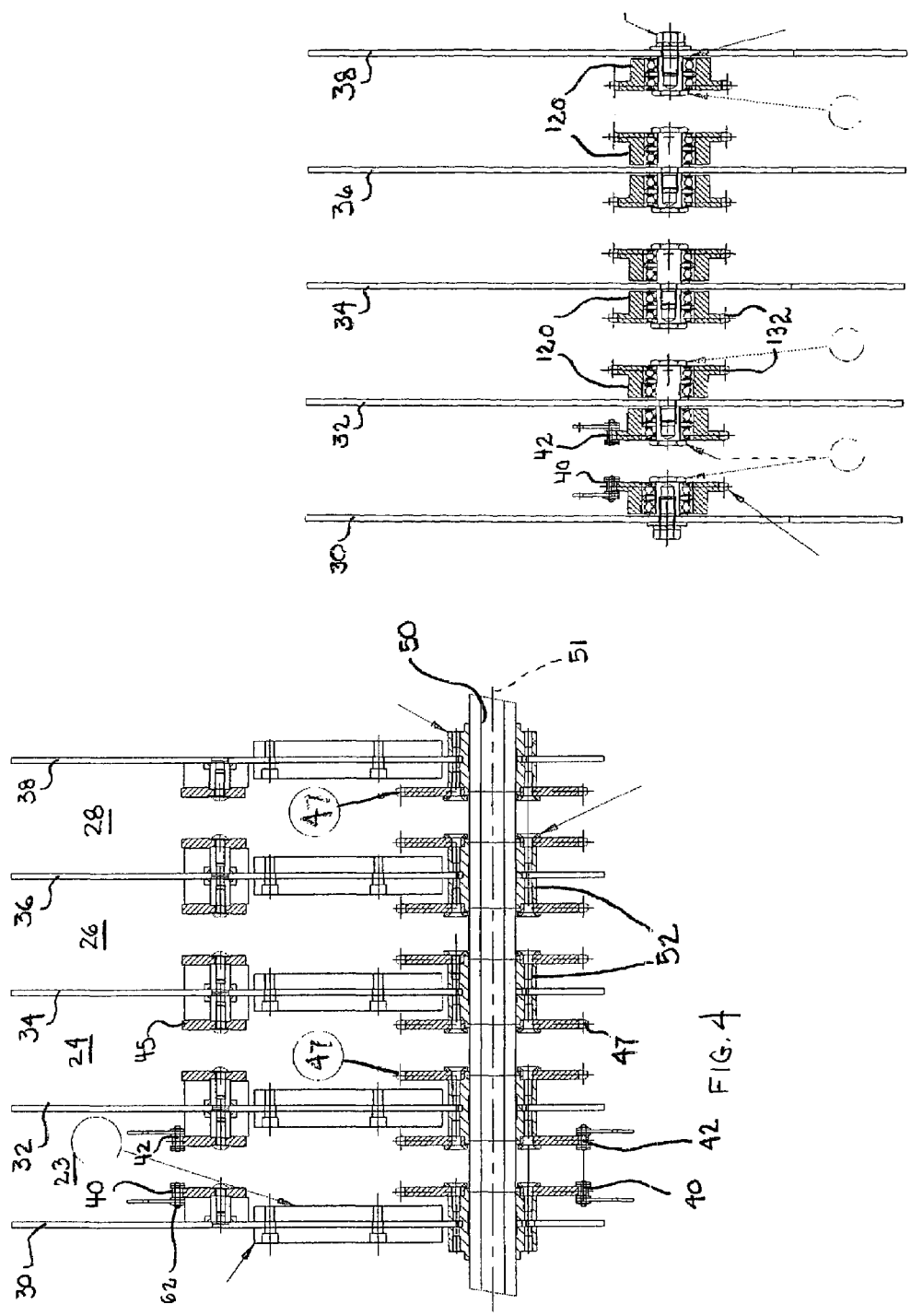

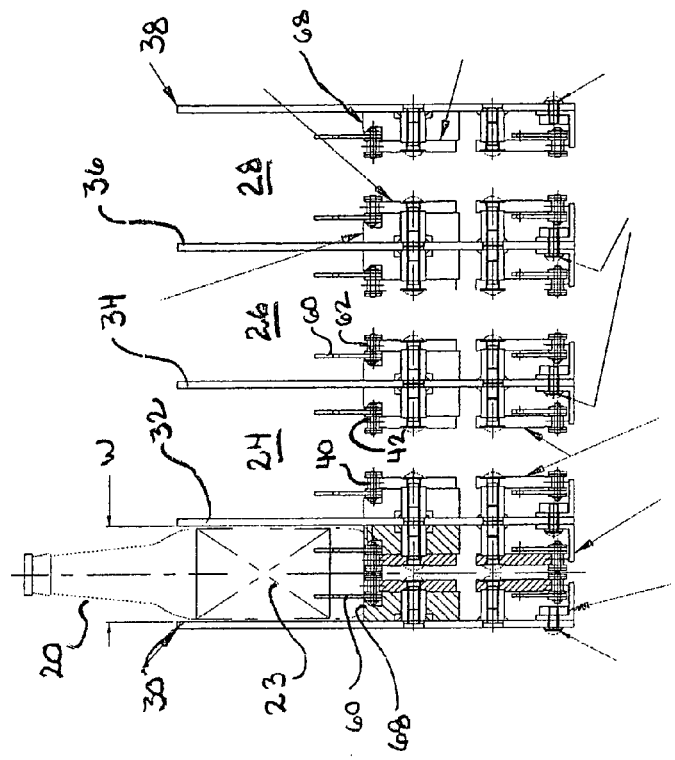
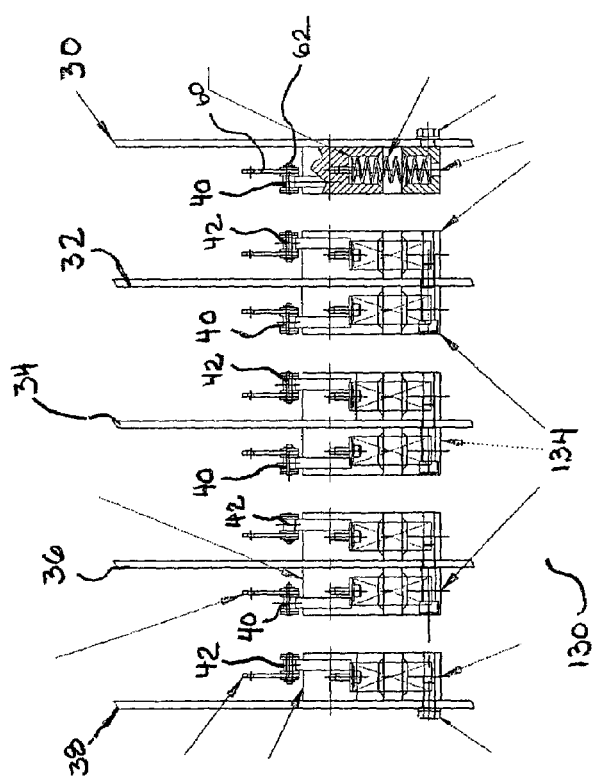
FIG. 7
FIG. 6

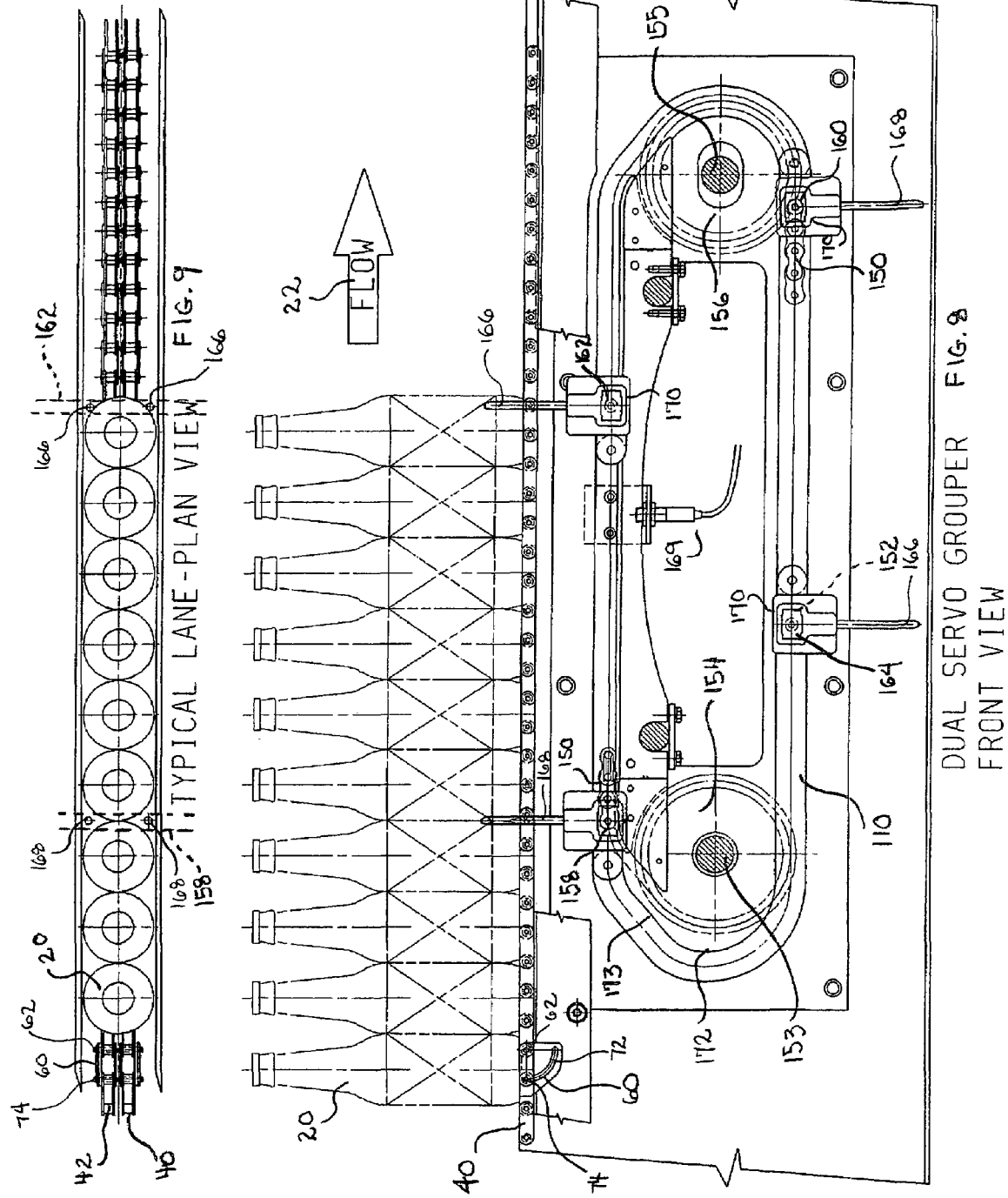

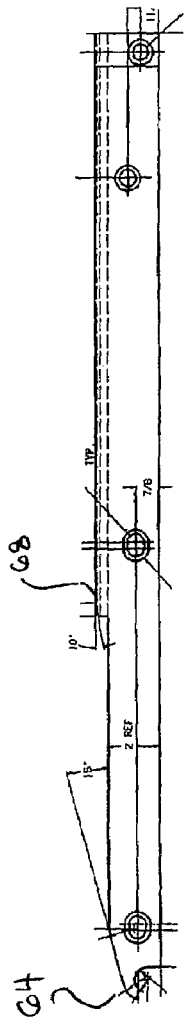
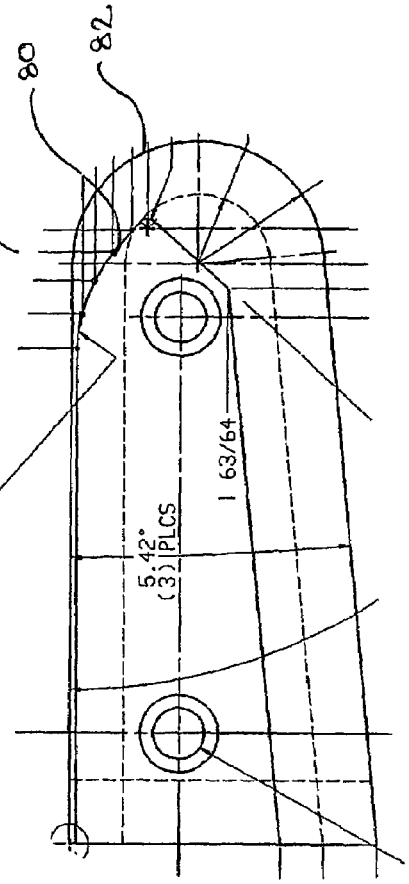
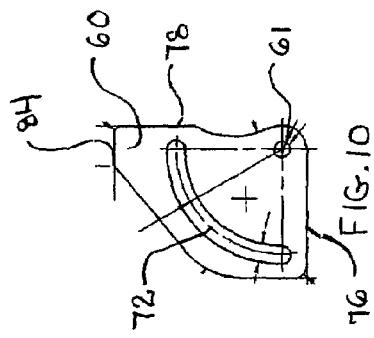

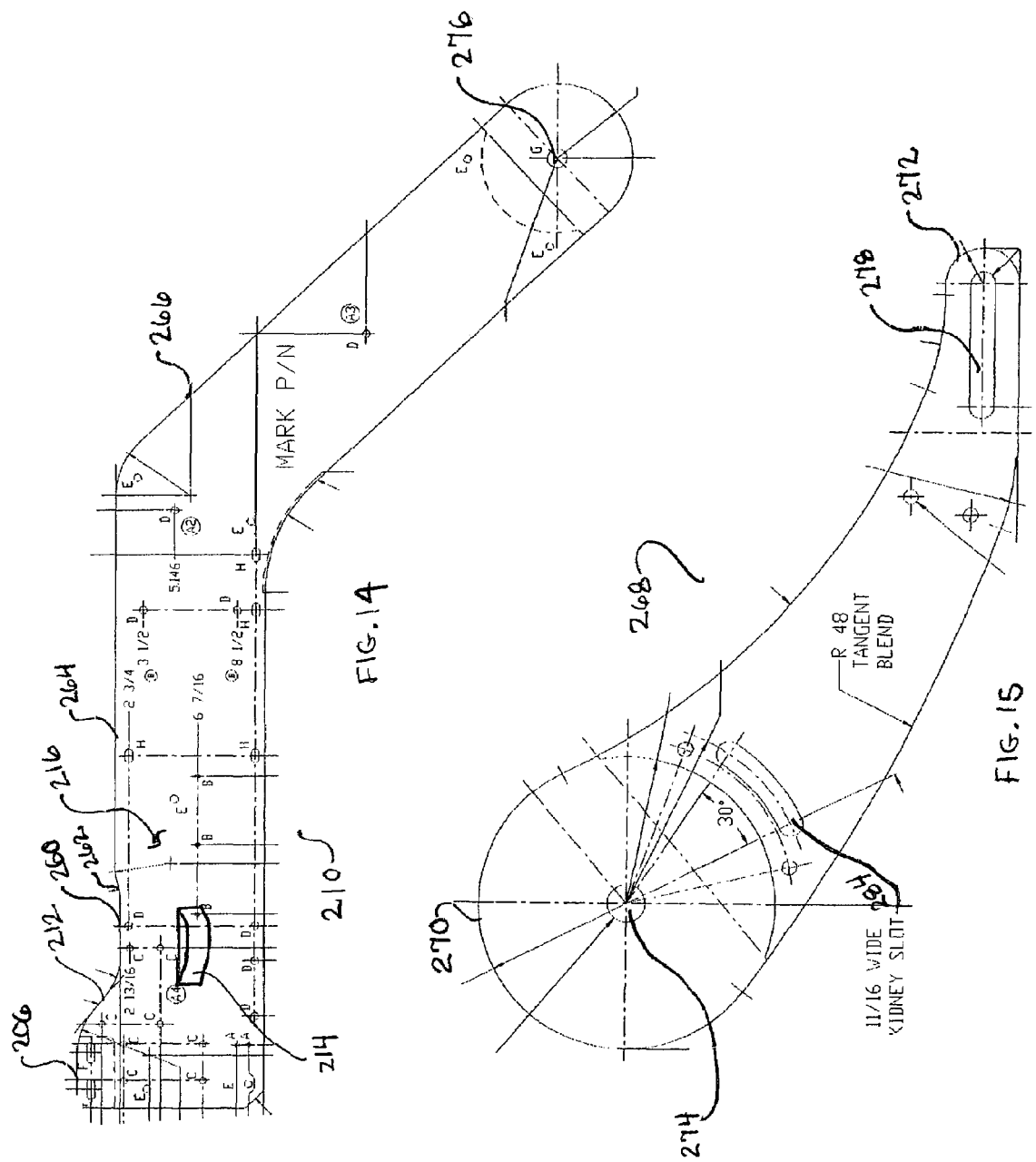

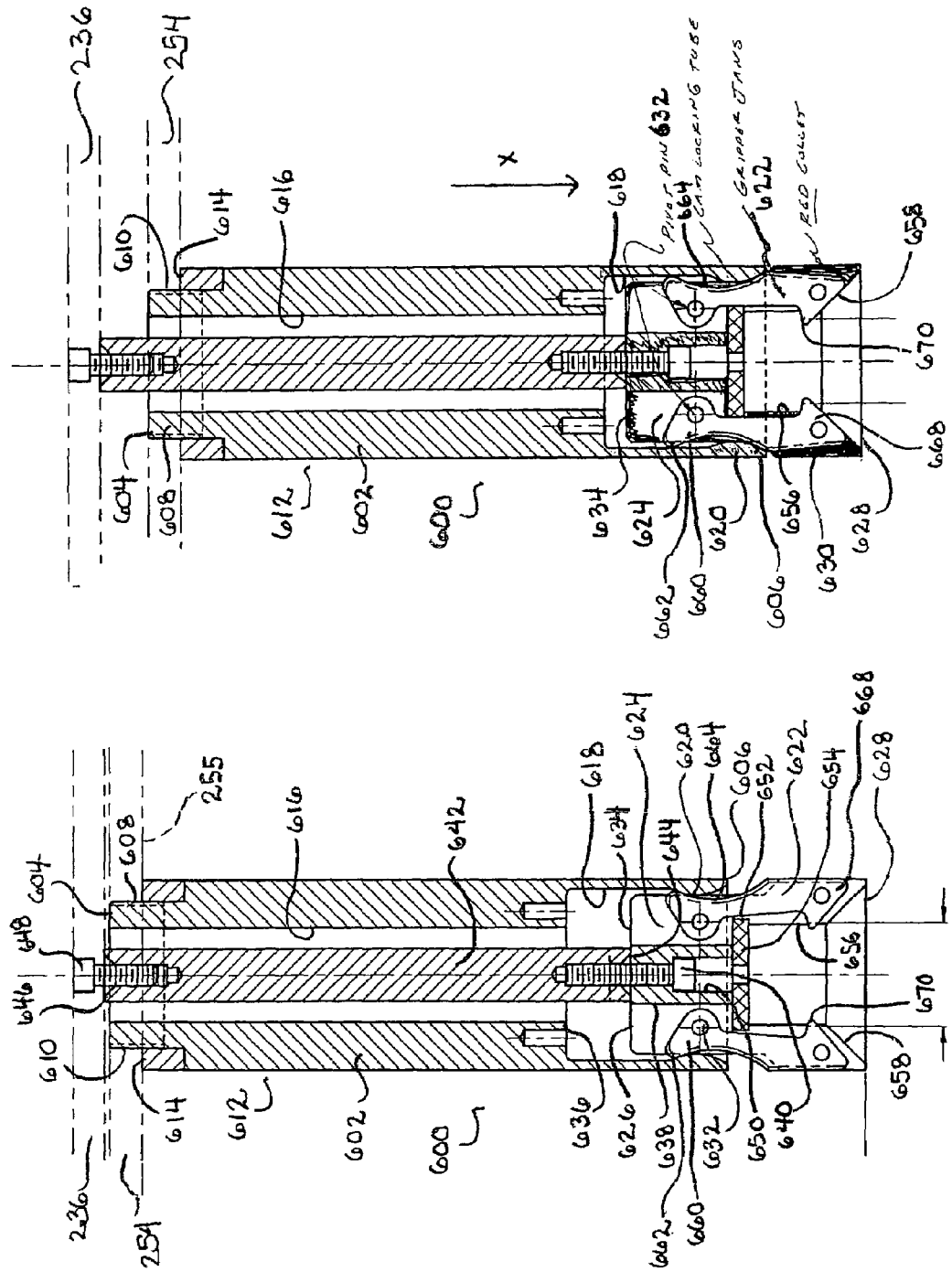

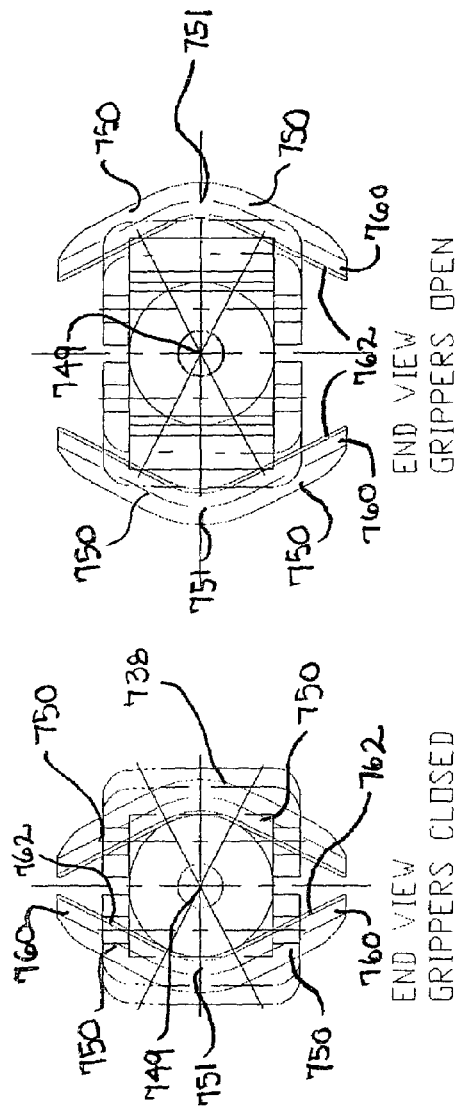
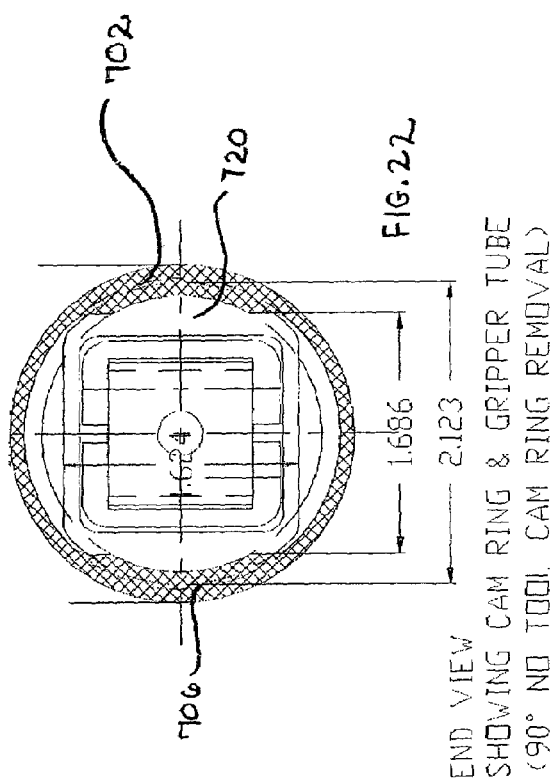

PACKAGING MACHINE

CROSS-REFERENCE TO RELATED APPLICATION

This application claims the benefit of U.S. Provisional Patent Application No. 60/548,763 filed Feb. 27, 2004, which is incorporated in its entirety herein by reference.

BACKGROUND

This invention relates generally to automated packaging machines, and, more particularly, this invention relates to improvements in a grouper section, gripper/grid section, and case feed section of an automated packaging machine.

Automated packaging devices are often used in high volume production facilities to prepare products for sale and shipment. One common automated packing device is a packaging machine, which divides up the product and drops it into a box or case. Packaging machines typically consist of five sections; a product infeed section, a case feed section, a lift table section, a grid table section and an operator interface section.

The product infeed section of the packaging machine includes a conveyor belt that transfers the product generally from an up stream process such as filling or labeling to the grid table section of the machine. The conveyor belt urges the product into grid lanes that align the product into a plurality of rows. Distribution of the product between the grid lanes is accomplished using the force of the conveyor belt and the force created between the individual product items to distribute the product between fixed, stainless steel lane guides. As the product passes between the lane guides, it rests on support strips positioned below the product. At the end of each grid lane is a separation bar, which stops the first product to enter the grid lane. The product is monitored using electronic sensors as it is fed into a grid lane. When the grid lane is filled with the desired number of products, a brake is applied to stop the serial flow of product along the conveyor belt and, thereby, prevent further product from entering the lane guides.

While the infeed section fills the grid with product, the case feed section delivers empty boxes or cases onto the lift table via a conveyor. The lift table section lifts the cases to a point beneath the grid lanes and waits for product to enter the case before descending. The lift table section is equipped with an air or oil lift table that prompts the up and down motion of the table. As the grid area is filled with product the lift table raises. Once the product is placed in the case, the lift table lowers. The case feed section then discharges the filled case, and an empty case enters the lift table. The operation will then repeat, depending on the number of products in the infeed section.

The grid section is responsible for releasing the product into the empty cases on the lift table. The grid section accomplishes the release of the product using two primary components: the support strip on which the product rests as it enters the grid area, and a grid basket, which guides the product into the case. Once the grid lanes are filled with product, the support strips are shifted to the side allowing the product to fall through the grid basket into the case or box. The support strips are then returned to their original position and the link brake is released allowing subsequent product to be moved from the product infeed into the grid.

An operator interface section controls the system and allows the operator to manage the operation of the machine. Typically, the interface is mounted on a swing boom that enables the operator to control the machine from either side to facilitate viewing of the process. This interface consists of a series of pushbuttons, which enable the operator to start, stop, or alter the performance of the machine, and locate/correct any fault conditions.

SUMMARY

In one exemplary embodiment, a continuous motion packaging machine for packaging product includes a grid assembly having fingers for guiding the product into a case and a case feed section for delivering cases to be packaged with product, wherein the product to be packaged is passed through the grid assembly in a single direction in the continuous motion machine.

In another exemplary embodiment, a packaging machine for packaging a product includes a lane for moving product, a driven chain within the lane, a lug pivotally attached to the chain and carried by the chain through the lane, and a cam surface positioned within the lane, wherein, when the lug moves by the cam surface, the lug is pivoted into the lane to engage with product moving in the lane.

In another exemplary embodiment, a packaging machine for packaging product includes a case feed section for delivering cases to be packed with product, a gripper head assembly cam device, and a selectively adjustable adjustment assembly for adjusting vertical position of one of the case feed section and the gripper head assembly cam device.

In another exemplary embodiment, a gripper head assembly for a packaging machine includes a gripper, the gripper including a cam support and a grabber, wherein an interior of the cam support includes a cam surface, and wherein the grabber includes a first end, a second end, a cam engaging surface between the first end and the second end, and a product engaging surface adjacent the second end. When the cam support moves away from the second end of the grabber, the grabber is moved to an open configuration corresponding to a first position of the gripper head assembly and, when the cam support moves towards the second end of the grabber, the grabber is moved towards a closed configuration corresponding to a second position of the gripper head assembly.

In another exemplary embodiment, a packaging machine for packaging a product, includes a dual servo grouper for separating product traveling in lanes in a grouper section of the packaging machine into product sets. The dual servo grouper includes a first chain, a first bar attached to the first chain, a first pin attached to the first bar, a second chain, a second bar attached to the second chain, a second pin attached to the second bar, a first servomotor having a first drive shaft for driving the first chain, a second servomotor having a second drive shaft for driving the second chain, and a conveyor chain moving at feed speed, wherein the first chain and the second chain are alternatingly accelerated and decelerated to move the first pin and the second pin within a lane of the packaging machine at different speeds, wherein a downstream pin inserted adjacent the conveyor chain allows product riding on the conveyor chain to accelerate until the product reaches feed speed.

In another exemplary embodiment, a packaging machine for packaging a product, includes a plurality of lane guides, at least one lane for moving product, each lane defined between an adjacent pair of lane guides, at least one chain within each of the at least one lane, each of the at least one chain attached to one of the plurality of lane guides, and wherein the plurality of lane guides are movable to alter a width of each lane.

In another exemplary embodiment, a method of packaging a product in a continuous motion packaging machine includes positioning a grid section between a product to be packaged and a case in the continuous motion packaging machine.

In another exemplary embodiment, a continuous motion packaging machine includes a grid section positionable between a product to be packaged and a case.

In another exemplary embodiment, a continuous motion packaging machine is disclosed wherein a product to be packaged and a case for packaging the product are merged together while the product and the case are moved downstream by the machine.

BRIEF DESCRIPTION OF THE DRAWINGS

These and other features, aspects, and advantages of the embodiments described herein will become better understood with reference to the following description, claims and accompanying drawings in which:

FIG. 2 is a front cross-sectional view of an exemplary grouper section for the packaging machine of FIG. 1;

FIG. 3 is a top elevation view of the grouper section of FIG. 2;

FIG. 4 is a side cross-sectional view of exemplary lanes, drive shaft, and drive sprockets of the grouper section taken along line 4-4 of FIG. 2;

FIG. 5 is a side cross-sectional view of exemplary lane guides and idler sprockets of the grouper section taken along line 5-5 of FIG. 2;

FIG. 6 is a side cross-sectional view of exemplary lane guides and chain tensioners taken along line 6-6 of FIG. 2;

FIG. 7 is a side cross-sectional view of exemplary lanes, a product, and a cam taken along line 7-7 of FIG. 2;

FIG. 8 is a front cross-sectional view of an exemplary dual servo grouper for the grouper section of FIG. 2;

FIG. 9 is a top elevation view of one exemplary lane in the area of the dual servo grouper of FIG. 8;

FIG. 10 is a front elevation view of an exemplary grouper lug for attachment to a chain within the grouper section of FIG. 2;

FIG. 11 is a front elevation view on an exemplary cam surface for use in a lane within the grouper section of FIG. 2;

FIG. 12 is a front elevation view of an exemplary nose piece for use in a lane within the grouper section of FIG. 2;

FIG. 14 is a front elevation view of an exemplary first cam piece for a cam device of a gripper head assembly for use in the packaging machine of FIG. 1;

FIG. 15 is a front elevation view of an exemplary lowering cam piece for pivotally attaching to the first cam piece of FIG. 14;

FIG. 16 is a cross-sectional view of an embodiment of an exemplary gripper for the gripper head assembly of the packaging machine of FIG. 1, with the grabber of the gripper shown in an open configuration;

FIG. 17 is a cross-sectional view of the gripper of FIG. 16, with the grabber shown in a closed configuration;

FIG. 20 is an end plan view of the gripper of FIG. 19;

FIG. 21 is an end plan view of the gripper of FIG. 18;

FIG. 22 is an end plan view of a cam and cam support of the gripper of FIGS. 18-19;

DETAILED DESCRIPTION

A product must go through a number of steps to transform the raw material into a useful product. These steps can be numerous, including the mixing and processing of the raw material to create the base product, filling containers with the base product and labeling the container to create the final product. Usually one of the last steps before shipment to a customer is the packaging of the final product (hereafter referred to as the product) into a conveniently sized case or box that will hold and protect the product during shipment. In high volume facilities, the process of filling cases with product is usually automated to reduce manufacturing cost.

Figure 1:
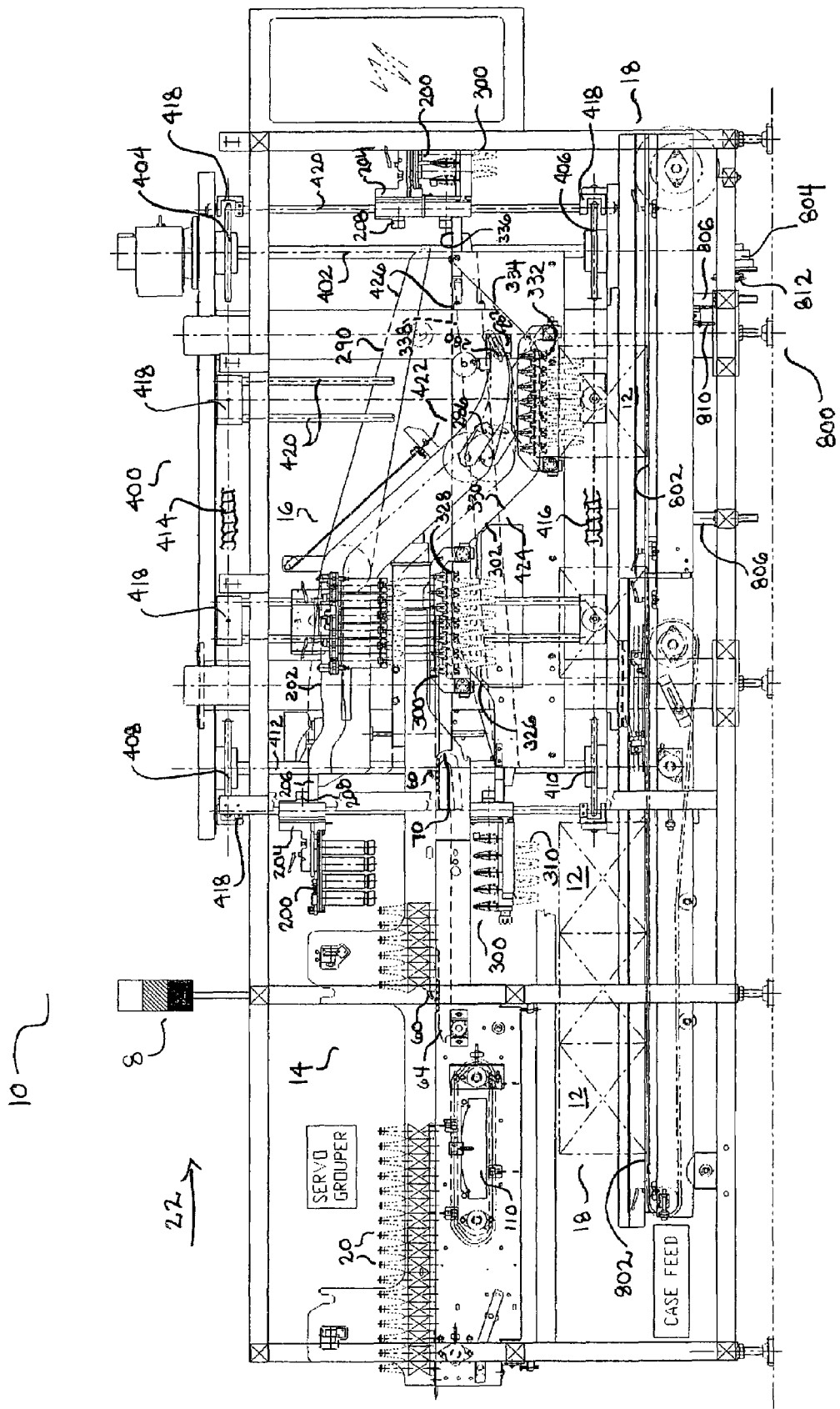
FIG. 1 is a front elevation view of an exemplary packaging machine.

Referring to FIG. 1, an overview of an automated packaging machine 10, such as a continuous motion packaging machine, is shown, with the product 20 flowing from left to right. Although shown as moving from left to right, it should be understood that a reverse configuration of the packaging machine 10 is also possible, and therefore the flow direction 22 depicted should not be construed as limiting the packaging machine 10 from moving product 20 in other directions. The product 20, as exemplarily shown in FIG. 1, are bottles, however other product types are within the scope of the packaging machine 10. The packaging machine 10 includes an infeed section (not shown). The infeed section gathers product 20 and move it along the flow direction 22. The infeed section then pushes the product 20 to a grouper section 14. Grouper section 14 collates product 20 into individual lanes, and also separate the product into sections to prepare the product for gripper/grid section 16. Product 20 then moves to gripper/grid section 16, where product 20 is gripped and then lowered into a case in case feed section 18. While the product 20 is moving through the grouper section 14 and gripper/grid section 16, cases 12 are moving in the same flow direction 22 via the case feed section 18. A light tower 8 may be utilized to signal operation conditions, such as on, off, check status, etc. The packaging machine is run by a controller that utilizes sensory input, in the form of sensor signals, sent from sensors positioned at various points throughout the packaging machine 10. An operator interface connected to the controller allows an operator to input various data relating to product, however the controller includes software that enables the packaging machine to be automatically driven. For example, if an operator enters data relating to a particular product, the controller will automatically adjust the packaging machine, within the gripper/grid section and the case feed section, such that the packaging of the product from a gripper assembly through a grid assembly and into a case is successfully accomplished without having to deconstruct the machine. The sensory input also enables the controller to detect jams and automatically move at least one of the case feed section and the gripper assembly so that the jam can be cleared. Since the jam clearing movement is automatic, after the jam is cleared, the machine can easily be reset by the controller to its packaging mode.

Referring to FIGS. 2 and 3, grouper section 14 is illustrated. Grouper section 14 has a plurality of lanes, which in exemplary embodiments may range from two lanes to eight lanes. Additional lanes could of course be added if desired. In an exemplary illustrated embodiment, there are four lanes 23, 24, 26, and 28 and each lane is formed by lane guides 30, 32, 34, 36, and 38. In this embodiment, each lane 23, 24, 26, and 28 includes two continuous chains 40 and 42 that are driven along a chain path 43 at a selected feed speed by a drive shaft 50 (further shown in FIG. 4), having a longitudinal axis 51.

The path 43 that the chains 40, 42 follow is a continuous path extending from a first end 102 adjacent the infeed section. As the flow 22 has previously been exemplified as directing product from left to right, the chains 40, 42 are described herein as moving in a clockwise direction, however the packaging machine 10 may operate in a reverse direction as previously described. As the chains 40, 42 move around sprockets 104, they move directly below product 20 in section 106 as the product 20 enters into the grouper section 14. Section 108 of the path 43 defines an area where the chains 40, 42 move over dual servo grouper 110 that serves to separate a limited number of the product 20 from product traveling behind the separated group and accelerates the separated product in a controlled manner, as will be further described below with respect to FIGS. 8-9. In sections 106 and 108 of path 43, the chains 40, 42 are responsible for carrying the product 20 in the flow direction 22 as the product 20 rides directly upon the chains 40, 42 in these sections.

Section 112 of the path 43 defines a location where timing lugs 60 (further described below with respect to FIGS. 10-12), pivotally attached to selected locations of the chains 40, 42, are pivoted into the path of the product 20 by a cam 64 to push the product 20 in the flow direction 22. That is, the timing lugs 60 are pushed from an interior section 100 of the chain path 43 to an area 101 that is exterior of the chain path 43. Section 114 of the path 43 defines an area of the path 43 where the product rides upon a raised portion ("drag strip") 68 of the cam 64 rather than upon the chains 40, 42. The chains 40, 42 continue to move underneath the product 20 in section 114 although it is the timing lugs 60 attached to the chains that are pushing the product 20 rather than the product 20 being directly carried by the chains 40, 42, as further shown in FIG. 7. As shown in FIG. 7, a top surface of the raised portion 68 of cam 64 is slightly higher than a top portion of the chains 40, 42. As the chains 40, 42 move towards second end section 116, a second end cam is provided for the chains 40, 42 to move around and away from the product 20.

Section 118 of the path 43 defines a first portion of the chains' return trip. After section 118, the path 43 wraps around idler sprockets 120 in path section 122, further shown in FIG. 5 to provide grid assembly 300 (discussed hereinafter) clearance under the grouper section 14. The sprockets 120 also serve to allow for a maximum amount of wrap around drive sprockets 52 and a narrow silhouette where the grid section 300 sweeps around. As can be envisioned, without sprockets 120, the chain path 43 would extend from the second end 116 directly to the drive sprockets 52, which would make the path 43 take up greater room in the packaging section 10 (thus interior section 100 would be larger), and the engagement between the chains 40, 42 and the drive sprockets 52 would be much more limited. Sprockets 120 are rotatable with respect to the lane guides 30-38 and include chain carrying outer portions 132. Path section 124 of the path 43 defines where the chains 40, 42 are driven by the drive sprockets 52, further shown in FIG. 4, and further described below.

Section 126 defines a portion of the path 43 where the chains 40, 42 pass below the dual servo grouper 110. Section 126 leads to section 128 of the path 43 which defines where the chains 40, 42 pass over a chain tensioner 130, further shown in FIG. 6, for maintaining all of the chains 40, 42 within each lane at a proper tension. While chain tensioning itself may be accomplished via any known chain tensioning elements 134, the chain tensioner 130 of this packaging machine 10 has the chain tensioning elements 134 directly connected to the lane guides 30-38 such that changing the size of the lanes 23, 24, 26, 28 does not affect the ability of the chain tensioner 130 to maintain proper tension on the chains 40, 42. That is, as lane size is changed via the manipulation of lane guides 30-38, the chain tensioning elements 134 of chain tensioner 130 are automatically adjusted to remain in contact with the chains 40, 42.

For the purpose of lane size changing, drive sprockets 52 are slidably positioned around the drive shaft 50. Chains 40 and 42, which may be slip chains, are attached to the lane guides 30-38 via chain carrying elements 45 and there is a slidable sprocket 52 for each lane guide. The sprockets 52 include chain carrying outer portions 47 that carry the chains 40, 42 (as shown in lane 23). Because chains 40 and 42 ride upon chain carrying elements 45 that are attached to lane guides 30, 32, 34, 36, and 38, chains 40 and 42 will move with lane guides 30-38 when lane guides 30-38 are moved to change the width of the lanes 23, 24, 26, 28. The width of the lanes 23, 24, 26, 28 is changeable to allow for through put of different size product 20. When lane guides 30, 32, 34, and 36 are adjusted for width, the whole system including chains 40 and 42 and chain carrying elements 45 are all moved a fixed dimension with the lane guides. The sprockets 52, while not directly connected to lane guides 30-38, are captured to a lane guide in pairs, and will naturally slide along the drive shaft 50 to reach a suitable drive position for the chains 40, 42 when the chains 40, 42 are moved via movement of the lane guides and chain carrying elements 45. While an outer lane guide, e.g. lane guide 38, may also be movable, it is within the scope of this packaging machine 10 to have lane guide 38 remain fixed, so that the remaining lane guides 30-36 can move relative to a fixed lane guide 38. If the lane size is changed via manipulation of the lane guides 30-36, the width of the lanes is changed throughout the grouper section 14. Manipulation of the lane guides 30-36 can be accomplished by manually grabbing a top portion of a chosen lane guide and moving it in a desired direction to either reduce or enlarge a width of a lane.

Drive shaft 50 can be driven from a main shaft of the packaging machine 10. In an exemplary embodiment, drive shaft 50 is a hex shaft as shown in FIG. 2. Drive sprockets 52 that are mounted to drive shaft 50 includes a complementarily, hexagonally shaped inner bore so that sprockets 52 are slidably located on drive shaft 50. While a hexagonally shaped drive shaft 50, with complementary driven sprockets 52, is shown, it would be within the scope of this packaging machine 10 to have an alternate cross-sectional shape for the drive shaft 50, such as any other shape that allows for driving the sprockets 52 as well as allowing for sliding of the sprockets 52 along the drive shaft 50. If a circular cross-sectional shape for the drive shaft 50 is chosen, then additional bearings for ensuring the drivability of the sprockets 52 would also have to be utilized. Since the drive sprockets 52 must rotate with the drive shaft 50 to drive the chains 40, 42 within the lanes, the sprockets 52 are not fixedly attached to lane guides 30-38, but rather float with each lane guide 30-38. That is, the sprockets 52 rotate with respect to the lane guides. Upon movement of chains 40 and 42, the sprockets 52 will necessarily slide along the drive shaft 50 to a neutral drive position within chains 40 and 42. Sprockets 52 have a broached hub with clearance so that the sprocket can be slid and still drive chains 40 and 42.

Turning to FIGS. 8-9, the dual servo grouper 110 is shown in greater detail. The dual servo grouper 110 includes two chains, first chain 150 as shown, and second chain 152 hidden from view. There are two sprockets, 154, 156 driven by drive shafts 153, 155, respectively, for defining turning points of the chains 150, 152. The chain 150 is driven by drive shaft 153 while the chain 152 is driven by the drive shaft 155, although an alternate configuration may also be accomplished. The sprocket 154 on the drive shaft 153 drives the chain 150, while an idler sprocket for the chain 150 is positioned on the drive shaft 155. It should be understood that there is a drive engagement between the drive shaft 153 and the sprocket 154, while the idler sprocket is merely be allowed to spin freely upon the drive shaft 155. That is, the idler sprocket on the drive shaft 155 is not driven by the drive shaft 155. Likewise, the sprocket 156 on the drive shaft 155 drives the chain 152, while an idler sprocket for the chain 152 is positioned on the drive shaft 153. While there is a drive engagement between the drive shaft 155 and the sprocket 156, the idler sprocket for chain 152 is allowed to spin freely upon the drive shaft 153, and is therefore not driven by the drive shaft 153. Each drive shaft 153, 155 for the drive sprockets 154, 156 are controlled by a different servomotor (where the servomotors may be positioned on a back of the packaging machine 10, or at any other convenient location) so that there can be independent control of the speed of each of the chains 150, 152. That is, chain 150 may travel at different speeds than chain 152, including, for example, allowing one of the chains 150, 152 to stop while the other chain 150, 152 continues to move.

Attached to each chain 150, 152 are a selected number of bars that extend from the chains 150, 152 and pass underneath each lane 23, 24, 26, 28. In the illustrated example shown in FIGS. 8-9, each chain 150, 152 includes two attached bars. Chain 150 includes bars 158 and 160, and chain 152 includes bars 162, 164. Thus, while different systems may utilize different length chains, and therefore may have a varying number of bars present, the system 10 disclosed herein employs four bars as shown. The bars 158, 160, 162, and 164 are alternately attached to the chains 150, 152 as they present themselves below section 108 of chain path 43. That is, in the flow shown in FIG. 8, bar 162 of chain 152 appeared first underneath section 108, then bar 158 of chain 150, then bar 164 of chain 152 will move underneath section 108, then bar 160 of chain 150, then back to bar 162 of chain 152, and so on.

The bars 158, 160, 162, 164 extend substantially perpendicularly with respect to the lanes 23, 24, 26, and 28 and each include pins, where there is at least one pin on each bar for each lane. As shown in FIG. 9, there is a pair of pins 166, 168 on each bar 158, 160, 162, 164 for each lane 23, 24, 26, 28. For distinguishing between the pins 166 positioned on bars 162, 164 attached to chain 152, and pins 168 positioned on bars 158, 160 attached to chain 150, the pins 166, 168 are given different item numbers, however the pins 166, 168 may be identically formed. Each pin 166, 168 is provided on a cam connection 170 such that, when the chains 150, 152 round the dual servo grouper cam 172, the cam connection 170 for each pin allows the pins 166, 168 to enter the lanes perpendicular to the direction of flow 22, rather than at an angle which could knock down product 20 and cause a jam. The dual servo grouper cam 172 is shaped with a flattened section 173 such that the pins 166, 168 are rotated to a substantially perpendicular position with respect to the lanes prior to entry within the lanes. The perpendicular entry of a pin into a lane for product set separation is a commercially known configuration from product number 296 Continuous Trip Packer commercially available from Standard Knapp, Portland, Conn.

The chains 40, 42 within the lanes can be moving at a particular speed ("lane chain" speed or "feed" speed), such as, for example, 36 inches per second. If the product 20 entering from the infeed section into the grouper section is not moving at the same rate, it may be at risk of falling over. To prevent that from happening, bottles are allowed to gain speed on the chains 40, 42 at a controlled rate by the dual servo grouper 110. The dual servo grouper 110 allows the product 20 to accelerate on the chains 40, 42 to the speed of the chains 40, 42 while separating the product 20 into product sets. One line of pins, e.g. pins 166 from bar 162 first holds up a line of product. That is, the product set behind the pins 166 will not travel at the speed of the chains 40, 42 but instead at the reduced speed of the chain 152. The reduced speed, which includes completely stopping the chain 152, prevents the product positioned behind the pins 166 from moving down the lanes at the same speed of the chains 40, 42, although the chains 40, 42 continues to slide past the bottom of the product 20. At some point, which is determined by sensors positioned within the dual servo grouper, the pins 166 are moved down the lanes such that when the next line of pins, e.g. pins 168 from bar 158 comes up behind a selected number of product, e.g. six bottles in each lane, the first pin, e.g. pins 166, speeds up at that point, and accelerate until they disappear. That is, the chain 152 will accelerate thus accelerating the pins 166 and allowing the product set between the pins 166 and 168 to accelerate. By "disappear", it should be understood that the pins 166 are actually rounding the sprocket 156 of the chain 152 so that it passes below the surface of the lanes, therefore not affecting the product 20 that have accelerated to the appropriate speed. The acceleration allows the product 20 to ramp up to the appropriate speed, the speed of the chains 40, 42, without a sudden onset of a greater speed, and therefore the product 20 is much less likely to fall over. A third line of pins, e.g. pins 166 from bar 164 attached to chain 152, then enters the lanes to hold up a next set of product while the product previously held up by the second line of pins, pins 168 from bar 158, begins to accelerate. The process continues with the chains 150, 152 alternatingly accelerating when a set of product is separated from a downstream line of product, and decelerating as pins exit the product lanes and before the pins enter the product lanes. When one chain is in acceleration mode, it moves past the other chain, and vice versa. Of course, other speed patterns (including any arrangement of stopping, starting, accelerating, decelerating, and running at steady speed) of the chains 150, 152 are within the scope of the dual servo grouper, and the speed pattern for each chain 150, 152 is determined using product information, information from sensors, e.g. sensor 169 shows one example of a sensor, positioned within the dual servo grouper 110, information from the servo motors, or any combination of the above information. The controller for the packaging machine 10, i.e. which includes a computer system that runs the machine 10, will be informed of the location of the pins 166, 168 from the servomotors attached to the chains 150, 152 and from the various sensors provided in conjunction with the dual servo grouper 110. Thus, this system uses servo drives to, in a controlled manner, allow product to accelerate on the chains 40, 42, where the chains 40, 42 are moving at a constant velocity, to the speed of the chains 40, 42.

After sets of products have been defined and accelerated using the dual servo grouper 110, timing or grouper lugs 60 ("lugs 60"), shown enlarged in FIG. 10, are used to ensure that the product within a product set are positioned closely to each other for proper receipt within the gripper/grid section 16. As product comes through from infeed section to grouper section 14, product 20 is stacked against each other and moves along chains 40 and 42 through friction. At a designated point, lugs 60 come into contact with cam surface 64, which erects lug 60, and then lugs 60 push product 20 along chains 40 and 42, rather than the product merely riding on the chains 40 and 42, to gripper/grid section 16. A front view of some of the lugs 60 is also found in FIGS. 1, 2, and 8, and various side views of some of the lugs 60 are seen in FIGS. 3-7 and 9. An enlarged view of cam surface 64 is shown in FIG. 11, and a front view of the cam surface 64 is also seen in FIGS. 1 and 2. Drive shaft 50 is driven from a main shaft of the packaging machine 10 so that the lugs 60 stay synchronous with rest of machine 10, including the gripper/grid section 16. Each chain 40 and 42 includes a plurality of lugs 60 that are spaced at a set distance, which is also called the pitch. In an exemplary embodiment, the pitch is either 24 inches, 27 inches, or 36 inches. Lugs 60 are attached to chains 40 and 42 through a pivot pin 62, passing though pivot hole 61 in lugs 60, which allows lugs 60 to swing from a downward direction to an upward direction. That is, the lugs 60 pivot from a position inside of the chain path 43 (interior 100) to a position exterior of the chain path 43 (exterior 101). When lugs 60 are in the interior position, lugs 60 are folded down under chains 40 and 42 and move with the chains. When cam abutting surface 76 of lugs 60 contact a cam surface 64, lugs 60 pivot about pivot pin 62 and are pushed into the exterior area 101 of chain path 43. Lugs 60 include a radial groove 72 and a pin 74 attached to chains 40, 42 (shown in FIG. 8) is in communication with radial groove 72. Both pin 74 and radial groove 72 allow the movement of lugs 60 to be controlled and limited. That is, the radial groove 72 prevents the lugs 60 from completely spinning around the pivot pin 62.

To ensure that product 20 is registered against pushing surface 78 of lugs 60 with no spacing between the product 20, the product 20 comes into contact with a cam surface 68, which is set adjacent to chains 40 and 42 (shown in FIG. 7). Cam surface 68 is slightly higher than chains 40 and 42, thereby causing product 20 to slow down and register against lugs 60. Lugs 60 continue to push product to gripper/grid section 16. Because product 20 is being pushed by lugs 60, product 20 moves at the same speed as chains 40 and 42 and thus, product 20 can be properly timed and is set at the appropriate pitch as it reaches gripper/grid section 16. The arrangement of lugs 60 on chains 40 and 42 allow chains 40 and 42 to serve as both a slip feeding chain and a timing chain.

Cam surface 64 holds lugs 60 in an upward position until each lug reaches a nose piece 70 (FIG. 12). Nose piece 70 is shaped at nose piece cam surface 80 so as to allow the tips 84 of lugs 60 to move at a constant velocity as lugs 60 move around nose piece 70 via the chains 40, 42 moving around the chain surface 82. In other words, lugs 60 do not accelerate as lugs 60 go below bottom chain path 43. Instead, due to the shape of cam surface 80, the velocity of tip 84 of the lug 60 moves at a constant speed through grouper section 14. By keeping lugs 60 moving at the same speed, even around the nose piece 70, the product 20 does not get pushed ahead at the time the grippers are gripping the product 20 in gripper/grip section 16 by the tips 84. It should be understood that the lugs 60 are moved along at the constant speed of the chains 40, 42, however the tips 84 would accelerate around the return due to the shape of the lugs 60 if it were not for the nose piece 70 which prevents such an acceleration of the tips 84.

While FIGS. 10-12 only show one lug 60, cam surface 64, and nose piece 70, it should be understood that there are a pair of lugs 60 at each occurrence of lugs within the chain path 43, one lug for each chain 40, 42 at each location of lugs. As shown in FIGS. 4-7, the lugs 60 are attached to the chains 40, 42 via the pivot pin 62 such that each lug 60 is positioned between a chain and a lane guide. Since each lug location includes a pair of lugs 60, it should further be understood that each lane further includes a pair of cams 64 and nose pieces 70 each positioned at locations to engage with lugs 60.

Figure 13:
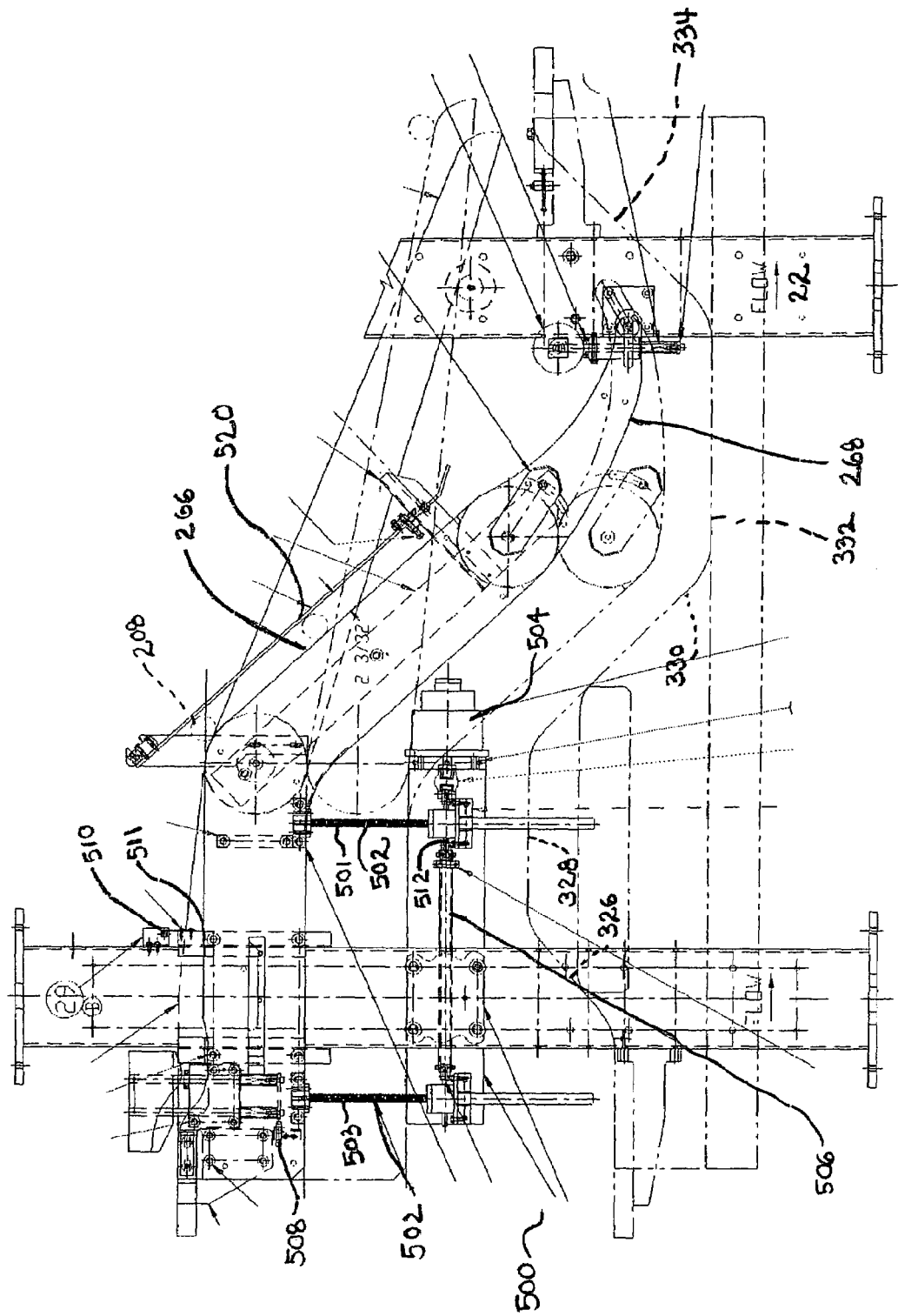
FIG. 13 is a partial cross-sectional view of an exemplary cam device and adjustment assembly for the gripper/grid section of the packaging machine of FIG. 1.

Turning again to FIG. 1, as the chains 40, 42 round the nose piece 70, the set of product is moved out of the grouper section 14 and into the gripper/grid section 16. Gripper/grid section 16 includes a plurality of gripper head assemblies 200 and grid assemblies 300. The cam surface 302 for grid assemblies 300 are not adjustable. Gripper head assembly 200 moves along a cam surface 202. Moveable cam surface 202 is adjusted, such as via jack screws 502 as shown in FIG. 13, to adjust for the varying heights of the product 20 or to clear a jam in the gripper head assembly 200. At the operator interface, an operator of the packaging machine 10 may adjust the height of cam surface 202, which then moves the height of gripper head assemblies 200. The operator may input new product data, which correlates to a predefined size. Such entering of product data may be as simple as scanning a product bar code at the operator interface, or can involve more detailed data entry regarding product specifics. The controller associated with the operator interface processes the entered data, determines the proper height setting for the gripper head assembly, and automatically adjust the height of the gripper head assembly. While jack screws are disclosed for raising or lowering the cam track 202, it should be understood that alternate methods for raising or lowering the cam track 202 would be within the scope of this packaging machine 10. Furthermore, while the height adjustment of the gripper head assembly 200 is described as automatically controlled by the controller, it should be understood that the operator can also override the automatic control by either entering specific directions at the operator interface with regards to height adjustment, or by manually controlling the adjustment assembly 500 for the gripper head assembly 200. Both gripper head assemblies 200 and grid assemblies 300 ride along fixed cam surface 302 and movable cam surface 202 while moving the product 20 from grouper section 14 into a case 12 at case feed section 18.

The gripper head assemblies 200 and grid assemblies 300 are arranged in pairs about a carousel 400 driven by a motor that operates a drive shaft 402 which rotates drive sprockets 404 and 406 positioned at first and second ends of the drive shaft 402. Likewise, idler sprockets 408, 410 are positioned at first and second ends of a shaft 412. A first carousel chain 414, partially shown, wraps around sprockets 404 and 408, and a second carousel chain 416, also partially shown, wraps around sprockets 406 and 410. When the motor rotates the drive shaft 402, the chains 414 and 416 rotate about the carousel 400. Each gripper head assembly 200/grid assembly 300 pair rotates about the carousel 400 via chain engaging connections 418 that each support, for example, a pair of bars 420 upon which the gripper assembly 200 and grid assembly 300 are supported. While the gripper assembly 200 and the grid assembly 300 are supported on the bars 420, it should be understood that they are movable in a vertical direction up and down along the bars 420, although the gripper assembly 200 is always above the grid assembly 300. In other words, a distance from the gripper assembly 200 to the first chain 414 is always less than a distance from the grid assembly 300 to the first chain 414. The location of the gripper assembly 200 and the grid assembly 300 with respect to the bars 420 depends on the location of the chain engaging connection 418 about the carousel 400 with respect to the cam device 422 of the gripper/grid section 16.

The cam device 422 may be formed from pieces of ultra high molecular weight polyethylene, although other materials are within the scope of the cam device 422. The packaging machine 10 includes several pairs of gripper head assemblies 200 and grid assemblies 300. In the illustrated embodiment, six pairs of gripper head assemblies 200 and grid assemblies 300 are utilized for continuously packaging product, although varying sizes of the machine 10 are within the scope of this system, and therefore various numbers of pairs of gripper head assemblies 200 and grid assemblies 300 can be utilized. For every pair, the packaging machine 10 includes at least one, and in the embodiment shown, two vertically oriented bars 420, that the gripper assembly 200 and grid assembly 300 travels up and down upon. Looking at one gripper head assembly 200, the gripper head assembly 200 is held by a frame 204 on the vertically oriented bars 420. One grid assembly 300 is held on the same set of vertically oriented bars 420, below the gripper head assembly 200. Depending on the location of the bars 420 with respect to the cam device 422, the gripper head assembly 200 is located at varying distances from the grid assembly 300. The vertically oriented bars 420 are positioned at the top and bottom of the carousel 400 with the chains 414, 416 surrounding the tops and bottoms of all of the bars 420 and defining a space enclosing the cam device 422 therein.

The holding frame 204 for the gripper head assembly 200 includes grooves for receiving the gripper assembly 200. Thus, any repairs on the gripper head assembly 200 are easily accomplished by simply removing it from the packaging machine 10 and bringing it to a more convenient location for examination and/or repair. Another advantage of having an easily removable gripper head assembly 200 is that gripper head assemblies 200 with alternative dimensions replace an existing gripper head assembly 200 if the product size is changed or if a different packaging set up is required. While grooves are disclosed, alternate variations of gripper head assembly retention devices on the gripper assembly frame 204 are within the scope of the machine 10. The holding frame 204 also includes a roller 208 for rolling upon the varied surfaces of the cam track 202, thus raising and lowering the gripper head assembly 200 depending on the cam surfaces of the cam track 202.

The packaging machine includes a cam device 422 that includes a converging side 424, where the gripper head assembly 200 and the grid assembly 300 are brought together, and a separating side 426 where the gripper head assembly 200 and the grid assembly 300 are separated from each other. The gripper head assembly 200 and the grid assembly 300 travel continuously about the cam device 422, where they converge on the converging side 424 to package product 20 into a case 12, and where they separate on the separating side 426 to make a return trip to the converging side 424 for packaging more product 20.

The cam track 202 for the gripper head assembly 200, while fixed during operation of the packaging machine 10, is movable in a vertical direction to clear a jam or to change the height to accommodate a different product 20 or case size 12. FIG. 13 illustrates an adjustment assembly 500 for the gripper head assembly 200. The adjustment assembly 500 moves a first cam piece 210 (as will be further described below with respect to FIG. 14), such that the height of the first cam piece, and any attached cam pieces such as the lowering cam piece 268 (described below with respect to FIG. 15), is adjusted. For exemplary purposes only, the adjustment assembly 500 includes an air motor 504 attached to a set of jacks 502 that support the cam track 202 thru a common drive shaft 506. The air motor 504 is coupled to a first jack 501 with a spindle passing through the first jack 501, so as to have an input and an output. A drive shaft 506 or tube connects the first jack 501 to the second jack 503 and a worm gear spins the jacks 502 so as to move both first and second jacks 501, 503 up or down. Both jacks 502 move an equal amount together. Drive shaft 506 has a metal protrusion that passes by a proximity detector so as to determine when the jacks are in their highest position. Once the cam device 202 reaches it highest position, that highest position is the home or zero position for the first cam piece 210, as shown at location 511. Revolutions are now counted to move the cam device 202 back down to the proper height. That is, as the air motor 504 rotates the drive shaft 506, the jacks 502 move the cam track 202 up or down depending on rotation. A first detector 510 is used to detect the first cam piece 210 in its highest position or zero in the height count as shown at location 511. A second detector 512 counts rotations of the drive shaft 506. This allows an operator to set the height of the cam track 202 by entering a new product on an operator interface touch screen. The first cam piece 210 will go to location 511, "zero", and move down, i.e. "count down", to the correct height automatically. Alternatively, an operator accessible switch or other adjustment devices are provided in the vicinity of the cam track 202 for adjusting the cam track 202 to be further from or closer to the cam track 302 for the grid assembly 300. When the first cam piece 210 is adjusted in height, the remainder of the cam track 202 including a return cam 290 on a separating side 426, will be adjusted with the first cam piece 210. Although only two jacks 502 are shown, it should be understood that additional jacks 502 are used to support the movement of the cam track 202 to the selected height. The jacks 502 are jack screws such that, in one exemplary embodiment, one turn of the drive shaft 506 by the motor 504 results in a height change of the first cam piece 210 of 0.025 inches, with a jack screw having a 0.125 pitch. Of course, alternate drive shaft 506 and jack 502 configurations would be within the scope of the adjustment assembly 500. For example, while the "zero" location is described as the home location, any selected location within the span of movement of the cam track 202 can be utilized as the home location, and the system can count up or down from that selected home location. The controller of the packaging machine 10 stores the selected information as well as receives the sensory input for automatically controlling the height adjustment assembly 500, unless overridden by the operator.

In addition, the movement of the gripper head assembly cam device 202 is also utilized when a jam is detected during the running cycle. The gripper head assembly frame cam roll 208 displaces a gripper head assembly jam detection cam, e.g. cam 520, (a cam positioned above the cam surface of the cam device 202, spaced sufficiently from the cam device 202 to allow the cam roll 208 to roll upon the cam surface of the cam device 202) upward actuating the gripper head assembly jam detector proximity sensor 508 or a sensor positioned relative to the cam 520. This then sends the cam device 202 and the gripper assemblies 200 up the bars 420 a given number of counts so that an operator has room to correct the misalignment between the gripper heads depending from the gripper assemblies 200 and the product 20. In addition, the amount of movement in the upward direction to clear the jam is kept to a small amount so that the product does not lift out of the grid section 300 when the cam device 202 is raised to clear the jam.

Turning now to FIG. 14, the cam track 202 includes the first cam piece 210 on the converging side 424 of the packaging machine 10. The first cam piece 210 includes an initial leveling area 206 where the gripper head assembly 200 travels after rounding the corner from the separating side 426. Shortly after the initial leveling area 206 is a product grabbing decline surface 212. As the roller 208 on the frame 204 for the gripper head assembly 200 rolls down the product grabbing decline surface 212, a product set aligns underneath the gripper head assembly 200 from the grouper section 14. As will be further described below, the collet assembly of each gripper in the gripper head assembly 200 is set over a product head as the roller 208 from the gripper head assembly frame 204 reaches the bottom of the product grabbing decline surface 212.

Figure 23:
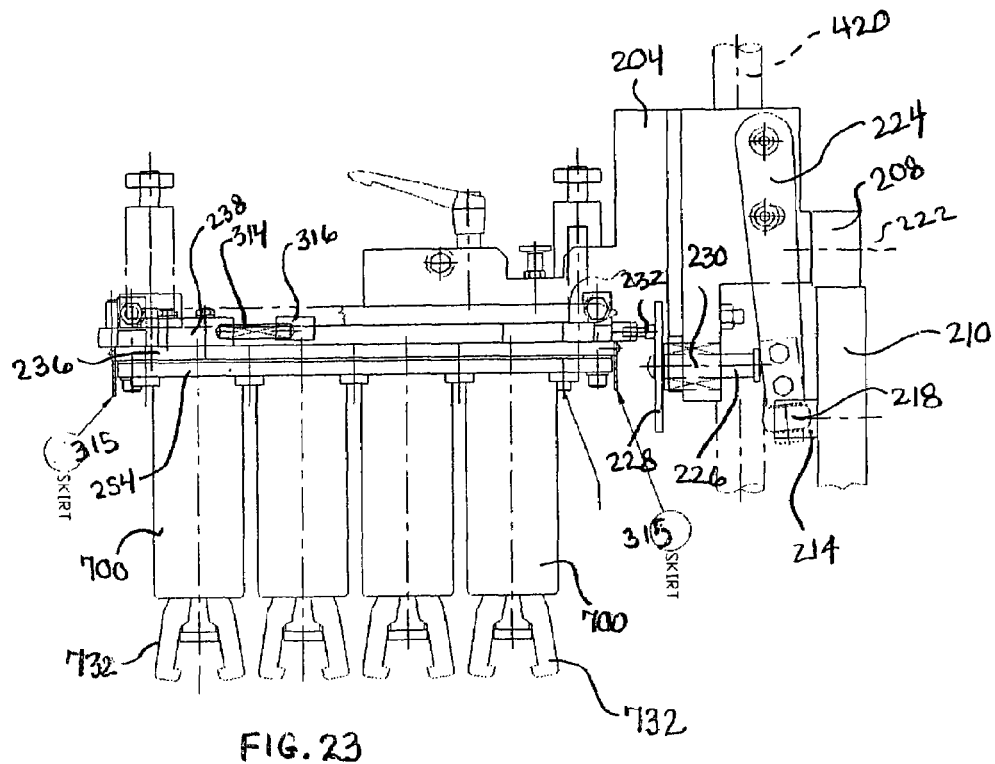
FIG. 23 is a side plan, and partial cross-sectional view of an exemplary gripper head assembly employing the grippers of FIGS. 18-19, with the gripper shown in an open configuration, gripper head assembly frame, and first cam piece for the gripper head assembly for the packaging machine of FIG. 1.

The cam track 202 for the gripper head assembly 200, following the product grabbing decline surface 212, includes a plate separating bump 214 that protrudes from the first cam piece 210 of the cam track 202 in a direction perpendicularly from a generally planar surface 216 of the first cam piece 210. The cam roller 208 that is attached to the frame 204 for the gripper head assembly 200 does not roll upon the plate separating bump 214, because the plate separating bump 214 is not positioned on the cam track upon which the cam roller 208 rolls. Instead, the gripper assembly frame 204 is provided with a plate separating roller 218 (see FIGS. 23-24) that rolls over the bump 214 causing a second plate 254 of the gripper head assembly 200 to separate from a first plate 236. When the second plate 254 separates from the first plate 236, the jaws of the collet assembly within the grippers of the gripper head assembly 200 close, thereby capturing product heads within the grippers, as will be further described below. Thus, as the gripper head assembly frame 204 moves over the plate separating bump 214 on the cam device 202, the product 20 is gripped within the gripper head assembly 200. While a plate separating bump 214 is described, alternate plate separating engagement devices may be utilize to engage with the gripper head assembly for separating the gripper supports for closing the grabbers within the grippers.

Immediately after the product is gripped at approximately location 260 of the cam piece 210, there is a slight incline ramp 262 on the first cam piece 210 before the gripper head assembly 200 begins its descent to converge with the grid assembly 300. The reason for this slight incline ramp 262 is so that the bottom of the product 20 does not get dragged along the rails (rails support the product 20 at this point within the gripper/grid section 16) by the gripper head assembly 200, which would cause possible damage to the product 20, or possible product tipping or jamming. It should be understood that even though the chains 40, 42 end before the product gripping area, product 20 that is positioned towards the rear of the product set still needs to travel past the remainder of the product gripping area, and thus the slight incline ramp 262 insures that all product 20 safely finishes the journey past the product gripping area after it has been gripped by the gripper head assembly 200. As the gripper head assembly 200 rolls along level area 264, the gripped product is carried slightly above product supporting rails so as not to be dragged on the rails.

After all of the product 20 within a product set has been moved past the product gripping area by moving along level area 264 of the first cam piece 210, the gripper head assembly 200 begins to converge with the grid assembly 300 by moving downwardly along a lowering ramp 266 on the first cam piece 210 of the cam track 202.

As previously described with respect to FIG. 13, the cam device 202 for the gripper head assembly 200 is vertically adjustable to change its distance from the fixed cam surface 302 for the grid assembly 300, for jam clearing or for adjustments relative to product height changes. Since the grid assembly cam surface 302 is not adjustable, it should be understood that a lowering cam piece 268 on the converging side 424 of the packaging machine 10 should not be adjusted vertically away from the grid assembly 300 without compensating for the convergence of the gripper head assembly 200 and the grid assembly 300. That is, when the gripper head assembly 200 rolls off of a lowering cam piece 268 onto the grid assembly 300, the meeting should be as smooth as possible. If the lowering cam piece 268 is moved further away from the fixed cam surface 302 for a bottle height adjustment, the gripper head assembly 200 cannot simply drop a greater distance onto the grid assembly 300. Thus, the movable cam surface 202 includes a lowering cam piece 268 that includes a large diameter radius between two tangency points for the smoothest possible landing of the gripper head assembly 200 upon the grid assembly 300 once the gripper head assembly 200 rolls off the second end 272 of the lowering cam piece 268. The lowering cam piece 268 is formed with a pivot point 274 adjacent the first end 270 of the lowering cam piece. The lowering cam piece 268 is attached to the first cam piece 210 at pivot point 274 of lowering cam piece and point 276 of first cam piece 210. The lowering cam piece is further provided with a slot 278 within lowering cam section 268 adjacent the second end 272. The slot 278 is straight as shown. A pin 280 (FIG. 1) passing through the slot 278 and into a stationary portion 282 of the carousel 400 allows the lowering cam piece 268 to pivot about point 274 when the movable cam device 202 is adjusted vertically to clear a jam or to accommodate a new bottle size. The lowering cam piece 268 is also provided with a kidney slot 284 through which a pin 286 passes and helps guide the movement of the lowering cam piece 268 during adjustments. Thus, the lowering cam piece 268 naturally self adjusts to provide a smooth landing of the gripper head assembly 200 onto the grid assembly 300. That is, even when the height of the movable cam device 202 is changed, the gripper head assembly 200 will always land smoothly on top of the grid assembly 300.

As shown in FIG. 1, as the product is being gripped by the gripper head assembly 200, the grid assembly 300 is positioned directly below the gripper head assembly 200 for eventually guiding the product set into a case 12. The gripper head assembly 200 and the grid assembly 300 are always perfectly aligned as they are positioned on the same slide bars 420. The case feed section 18 feeds a case 12 for positioning below the grid assembly 300. As the gripper head assembly 200 converges onto the grid assembly 300, the grid assembly fingers 310 begin to insert themselves into the case 12. Without product positioned between the fingers 310, the fingers are closed and easily insertable between sleeves that are positioned within the case 12. Such sleeves may be cardboard dividers, or the like, as is known in case packages. As the product, which is held by the gripper head assembly 200, is inserted through openings in the upper end of fingers 310, the fingers 310 separate to allow the product to pass through the fingers 310 and into their appropriate locations within a case 12. After the gripper head assembly 200 rolls off of the lowering cam piece 268, the gripper head assembly 200 fully rests upon the grid assembly 300. When the gripper head assembly 200 is engaged with the grid assembly 300 in this manner, plate closing knobs 312 (shown in FIGS. 25-26) which depend from the second plate 254 of the gripper head assembly 200, rest upon the frame of the grid assembly 300 and push the second plate 254 back towards the first plate 236. As will be further described with respect to FIGS. 23-27, when the second plate 254 is pushed back towards the first plate 236, rollers 248, 250 are pushed out of notches 240 in a latching bar 234. The latching bar 234 is allowed, by force of spring or springs 314 held relative to the latching bar 234 by a spring retainer 316, to move in a direction along the top surface 246 of the first plate 236 towards a disk 228 in the gripper head assembly frame 204. When the latching bar 234 moves in this direction, the rollers 248, 250 are positioned again on top of the latching bar 234, rather than within its notches 240. The rollers 248, 250 remain in this position because the latching bar 234 is biased by the springs 314 in this position, until the gripper head assembly again passes by the plate engaging bump 214 at the beginning of the converging side 424 of the carousel 400. When the second plate 254 is pushed towards the first plate 236 as described, jaws in the grippers on the gripper head assembly 200 are opened for releasing any product heads contained therein that has already been packaged in a case 12 and for engaging a new set of product to be packaged during another trip through the converging side 424.

The cam device 202 for the gripper head assembly 200 further includes a return cam 290 on the separating side 426 of the carousel 400. After the product set has been packaged into a case 12 and the grid assembly 300 carrying the gripper head assembly 200 thereon has traveled away from the case feed 18, the cam roller 208 of the gripper head assembly 200 engages with the return cam 290 thereby separating the gripper head assembly 200 from the grid assembly 300 as the gripper head assembly 200 is led increasingly away from the grid assembly 200 along its bars 420 until the return cam 290 peaks at the maximum height of the cam device 202 (for a chosen gripper assembly movable cam surface height). The gripper head assembly 200 then moves along the return cam 290 and around the sprocket 408 until it reaches the first cam piece 210 to then again lower the gripper head assembly 200 onto a set of product to be packaged and then upon the grid assembly 300 as previously described.

The fixed cam device 302 for the grid assembly 300 on the converging side 424 of the cam device 422 includes a first ramp incline surface 326 to reach a leveling surface 328 where the grid assembly 300 is positioned below a product set to be packaged, a ramp decline surface 330 where the grippers of the gripper head assembly 200 are fed through the fingers 310 of the grid assembly 300, a packaging area 332 where the gripper head assembly 200, grid assembly 300 and case 12 completely converge, and a second ramp incline surface 334 where the grid assembly 300 carries the gripper head assembly 200 upwardly along the bars 420 to remove the gripper head assembly 200 and grid assembly 300 from a package 12, thus allowing the package 12 to continue along the case feed section 18. The cam device 302 levels out at a leveling section 336 as it goes around the drive shaft 402 to bring the gripper head assembly 200 and the grid assembly 300 to the separating side 426 of the cam device 422.

On the separating side 426 of the cam device 422 of the carousel 400, as the return cam 290 for the movable cam device 202 begins its incline with return cam 290 to separate the gripper head assembly 200 from the grid assembly 300, the fixed cam device 302 on the separating side 426 includes a returning ramp decline surface 338 until the fixed cam device 302 levels off at leveling section 340 adjacent the shaft 412 for returning the grid assembly 300 to the converging side 424 of the cam device 422.

It should be understood that the packaging machine 10 utilizes a grid assembly 300 that comes from underneath the product 20 and the gripper head assembly, and therefore the product 20 experiences a one-way trip through the grid fingers. This is an improvement over prior methods of packaging where a grid system would first come over the product, the product would then be picked up and brought to a case, and then the product would be dropped back through the grid system when over the case or box. Such a system requires the product to experience a two-way trip through the grid system, and thus has greater room for jams and malfunction. It should also be noted that the one-way trip through the grid fingers is experienced while the grid assembly is continuously moving downstream in the continuous motion packaging machine, unlike intermittent motion machines that must stop product motion during normal operation.

Referring again to FIG. 1, case feed section 18 includes an adjustment assembly 800 for the case feed 802. The case feed 802 may be formed from several sections, however the cases 12 still travel smoothly across the case feed 802 from a first end to a second end. Adjustment assembly 800 operates in a similar manner as adjustment assembly 500 for the cam device 202, except that to reach the home or zero location, for the case feed 802, the adjustment assembly 800 for the case feed 802 moves the case feed 802 downwardly (further away from fixed cam device 302) instead of moving upwardly (towards fixed cam device 302). Adjustment assembly 800 moves the case feed 802 down (in a direction moving away from fixed cam device 302) until the case feed 802 is at its lowest location, which is the "home" or "zero" location. Once the zero location is known, a predetermined number of rotations are made to move the case feed 802 to the proper height as determined by the operator, or by the controller. Again, it should be noted that the home location may be any selected location instead of the zero location, in which case the controller would automatically determine whether the case feed should be counted up or down to its proper setting.

The case feed 802 are adjusted by using an air motor 804 in operable communication with a set of jacks (jack screws) 806, which in an exemplary embodiment includes four jacks 806 for lifting or lowering the case feed 802. Each set of two jacks 806 are coupled together by a drive shaft (not shown, but similar to drive shaft 506 in the adjustment assembly 500 shown in FIG. 13). As the air motor 804 rotates the drive shafts, the jacks 806 move the case feed 802 up or down (towards or away from the fixed cam section 302) depending on the amount of rotation of the drive shafts. A detector 810 are used to detect when the case feed 802 is in its lowest position or zero in the height count. A second detector 812 counts rotations of the drive shaft. This allows an operator to set the height of the case feed 802 by entering a new case size on an operator interface touch screen, or any other operator interface including, but not limited to a keypad, keyboard, scanner, etc. The case feed 802 moves down to zero position and count up to the correct height automatically via the controller, which utilizes sensory input from sensors positioned relative to the case feed 802 and/or operator input via the operator interface. Alternatively, an operator can utilize an adjustment mechanism controller (e.g. knob, switch, etc.) to directly adjust the height of the case feed 802 using the adjustment assembly 800. The movement of the case feed 802 also is utilized when a jam is detected during the running cycle. Case feed 802 moves down to or towards the lowest or zero height to remove a jam in the case feed section 18.

The gripper head assembly 200 includes a plurality of grippers for engaging with the heads of product 20. As shown in FIGS. 16-17, in one embodiment of a gripper, a gripper double acting cam device, from now on called gripper 600, forms part of a lowering head assembly, also known as the gripper head assembly 200. The gripper head assembly 200 includes a first support, which in the illustrated embodiment includes a first plate 236, which in operation is an upper plate, and a second support, which in the illustrated embodiment includes a second plate 254, which in operation is a lower plate. The second plate 236 is separable from the first plate 236 when the roller 218 of the frame 204 moves over the plate separating bump 214, or engages any other type of gripper support separating device, and the second plate 254 is brought back towards the first plate 236 using plate closing knobs 312 that engage with the grid assembly frame.

There are a plurality of grippers 600 attached to the first and second plates 236, 254. The number of grippers 600 should correspond to the number of product in a product set. Although it would be possible in some embodiments to provide more grippers 600 than necessary, the packaging machine 10 would fail to package the product appropriately if there were less grippers 600 than necessary. Also, at least the required number of grippers 600 should be arranged in a manner, which corresponds to the arrangement of product passing into the gripper/grid section 16. In the illustrated embodiment, each product set includes four lanes of six bottles passed to the gripper/grid section 16 from the grouper section 14, and therefore the gripper head assembly 200 includes twenty-four grippers 600 arranged in four rows and six columns. Of course, other arrangements of grippers 600 are within the scope of gripper head assemblies 200 usable with the packaging machine 10.

Each gripper 600 includes an outer cam support, illustrated as tube 602, which may, by example only, be formed from plastic. The outer cam support includes a first end 604 and a second end 606. The first end 604 includes threads 608 for threadably mating with an opening 610 in the second plate 254. The first end 604 has an outer diameter that is smaller than an outer diameter of a main section 612 of the outer cam support 602. A ledge 614 is formed between the first end 604 and the main section 612. The ledge 614 abuts against the surface 255 of the second plate 254 such that when the second plate 254 is separated from the first plate 236, the second plate 254 pushes the outer cam support 602 in the x direction as shown in FIG. 17. The outer cam support 602 further includes a first inner bore 616 that extends from the first end 604 of the outer cam support 602, and a second inner bore 618 that is larger in diameter than the first inner bore 616. Adjacent the second end 606 of the outer cam support 602, and within the second inner bore 618, a circumferential bump 620 is provided that serves as a cam surface for gripping jaws 622 of a collet assembly 624. It should be noted that the inner diameter of the cam tube 602 at the circumferential bump 620 is less than the inner diameter of a remainder of the second inner bore 618.

The collet assembly 624 includes a first end 626 sized for insertion within the second inner bore 618. Thus, an outermost diameter of the first end 626 of the collet assembly 624 is smaller in diameter than the diameter of the second inner bore 618. The collet assembly 624 includes a second end 628 that extends exteriorly from the outer cam support 602. The second end 628 of the collet assembly 624 has an outer diameter that is substantially the same as, or slightly greater than, an outer diameter of the main section 612 of the outer cam support 602. While the collet assembly 624 has a generally circular outer periphery, the outer periphery is interrupted by slots 630 formed to receive gripping jaws 622. While two jaws 622 are shown in the cross-sectional view of FIG. 16-17, it should be understood that more than two jaws may be employed, in which case an equal number of slots 630 should be formed into the exterior of the collet assembly 624. The illustrated embodiment includes a pair of jaws 622, and each jaw 622 pivotally attached to the first end 626 of the collet assembly 624 by passing a dowel pin (a pivot pin) 632 through one portion of the first end 626 of the collet assembly 624, through the jaw 622, and then back through another portion of the first end 626 of the collet assembly 624.

The first end 626 of the collet assembly 624 includes a first surface 634 that is substantially parallel with an inner ledge 636 formed between the first inner bore 616 of the outer cam support 602 and the second inner bore 618 of the outer cam support 602. Passing through the first surface 634 of the collet assembly 624 is a central bore 638 that is threaded for receiving a collet assembly removal screw 640. The collet assembly removal screw 640 secures a rod 642 that is secured at its second end 644 to the collet assembly 626 and at its first end 646 to the first plate 236. The rod 642 is secured to the first plate 236 with another screw 648. The collet assembly 626 includes a second bore 650 for receiving the head of the collet assembly removal screw 640, and a third bore 652 for receiving a crown protector 654. The crown protector 654 is made of rubber, or other similar material, for protecting the heads of product 20 that enter within the third bore 652 and also retains the collet locking screw 640. The collet assembly 626 further includes a fourth bore 656 for receiving a head of a product 20. The second end 628 of the collet assembly 624 is chamfered inwardly to the fourth bore 656. That is, the collet assembly 624 includes a frusto-conical shape 658 for guiding the head of a product 20 within the confines of the fourth bore 656.

Each jaw 622 of the collet assembly 624 includes a first end 660 that includes the pivot point 632 and a bump engaging cam 662. The bump-engaging cam 662 includes a concave surface 664 extending from the first end 660 of the jaw 622 towards the second end 668 of the jaw 622. The second ends 668 of the jaws 622 includes a product engaging surface 670. The product engaging surface 670 has an inner curvature that matches an inner curvature of a product 20. In an open position of the jaws 622, the inner perimeter of the fourth bore 656 of the collet assembly 626 is continuous with the inner curvature of the product engaging surface 670 of the jaws 622. In a closed position of the jaws 622, the product engaging surface 670 extends within the fourth bore 656 to engage with the product 20.

When the second plate 254 is adjacent the first plate 236 in the gripper head assembly 200, the outer cam support 602 of the gripper 600 is pulled upwardly in the position shown in FIG. 16. In this position, the circumferential bump 620 of the outer cam support 602 engages with an upper portion of the bump engaging cam 662 of the jaws 622. The circumferential bump 620 pivots the first end 660 of the jaws 622 inwardly such that the second end 668 of the jaws 622 move outwardly. With the second end 668 of the jaws 622 moving outwardly, any heads of products 20 received within the fourth bore 656 of the collet assembly 626 is free to move out of the gripper 600. When the second plate 254 is forced away from the first plate 236, as shown in FIG. 17, the outer cam support 602 is pushed over the collet assembly 626 such that the circumferential bump 620 is pushed in a direction towards the second end 668 of the jaws 622, thus pivoting the second end 668 of the jaws 622 inwardly about the pivot point 632. When the second end 668 of the jaws 622 are pivoted inwardly, the product engaging surfaces 670 of the jaws 622 extend within the fourth bore 656, and any portion of the product head, such as a bottle cap, that has a larger diameter than the distance formed between the product engaging surfaces 270 of opposing jaws 622 will be trapped from exiting the fourth bore 656 by the jaws 622. It should be understood that when a bottle, or other relevant product 20 to be packaged, is engaging with the gripper head assembly 200, the second plate 254 of the gripper head assembly 200 is adjacent with the first plate 236. When the bottle is ready to be held by the gripper head assembly 200, the second plate 254 will be forced away from the first plate 236 to position the outer cam support 602 as shown in FIG. 17, thus closing the jaws 622 to secure the product head therein. With the exception of the pivoting jaws 622, the collet assembly 624 remains stationary with respect to the first plate 236. As the second plate 254 moves uniformly towards and away from the first plate 236, all of the grippers 600 include jaws 622 which open and close substantially simultaneously. Thus, a gripper has been described that is free from springs and that opens and closes using mechanically cammed surfaces.

Figure 19:
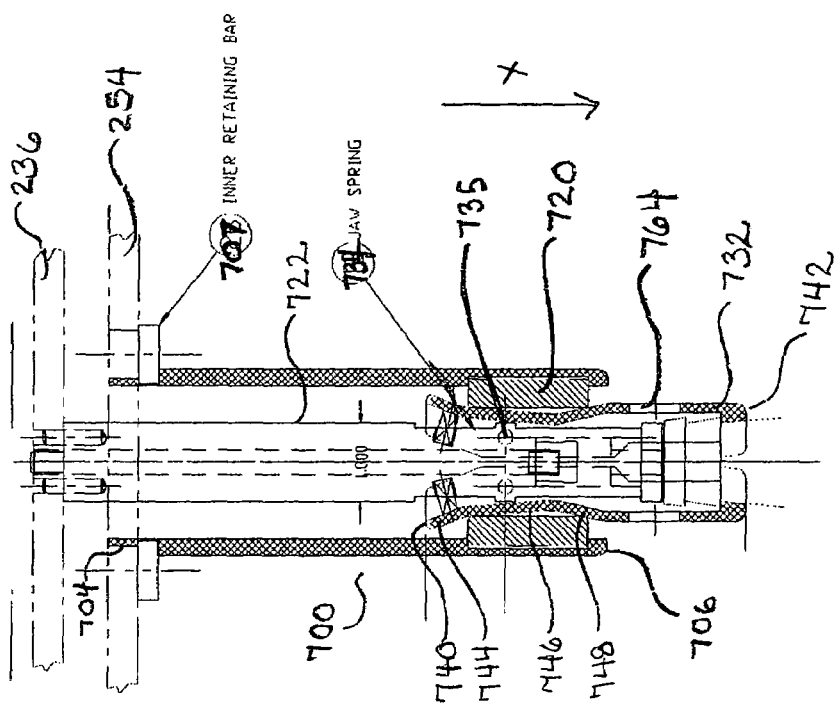
FIG. 19 is a cross-sectional view of the gripper of FIG. 18, with the grabber shown in a closed configuration.
Figure 18:
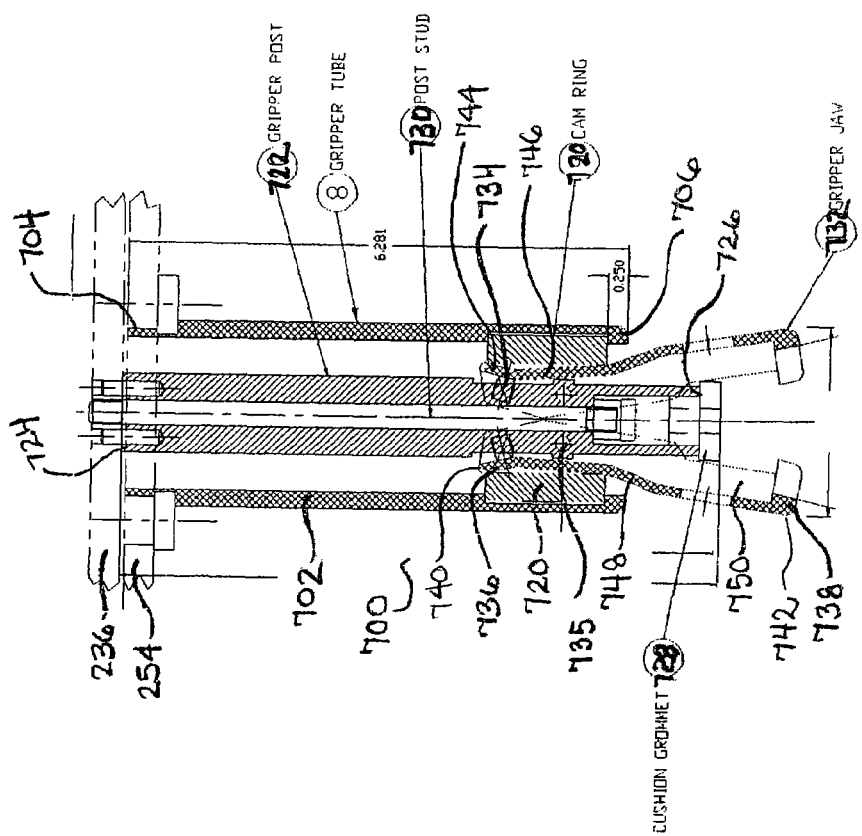
FIG. 18 is a cross-sectional view of another embodiment of an exemplary gripper for the gripper head assembly of the packaging machine of FIG. 1, with the grabber of the gripper shown in an open configuration.

An alternate embodiment of a gripper for use with the gripper head assembly 200 is shown in FIGS. 18-19. Similar to the gripper 600, the gripper 700 includes an outer support 702, illustrated here as a tube, having a first end 704 attached to the second plate 654, and a second end 706. An inner retaining bar 707 assists in securing the outer support 702 to the second plate 254. The circumferential bump 620 of the gripper 600 is replaced by a cam ring 720 secured within the cam support 702 adjacent the second end 706 of the cam support 702. The cam ring 720 is replaceable such that as the cam ring 720 gets worn down during use, it may be replaced. The cam ring 720, when in position, floats slightly within the support 702 to allow for manufacturing tolerances. The cam ring 720 is removable from the support 702 without the need of a tool, thus removable using a "toolless" procedure. The cam ring 720 includes interruptions to the otherwise circular ring 720 that correspond with correspondingly shaped interruptions on the second end 706 (see FIG. 22). These interruptions can include flattened portions, keyed portions, etc. When the interruptions are matched, the cam ring 720 is insertable and removable from the support 702. Once the cam ring 720 is inserted past the second end 706, it is rotatable within the support 702 such that the interruptions of the cam ring 720 and the interruptions of the second end 706 are misaligned, and therefore the cam ring 720 remains trapped within the support 702 during use. Of course, should the cam ring 720 require replacement, it is easily removable using a "toolless" procedure involving an approximately 90 degree, or a ¼ turn within the support 702 and pulling the cam ring 720 out of the support 702 when the interruptions of the cam ring 720 and the second end 706 are aligned.

Figure 25:
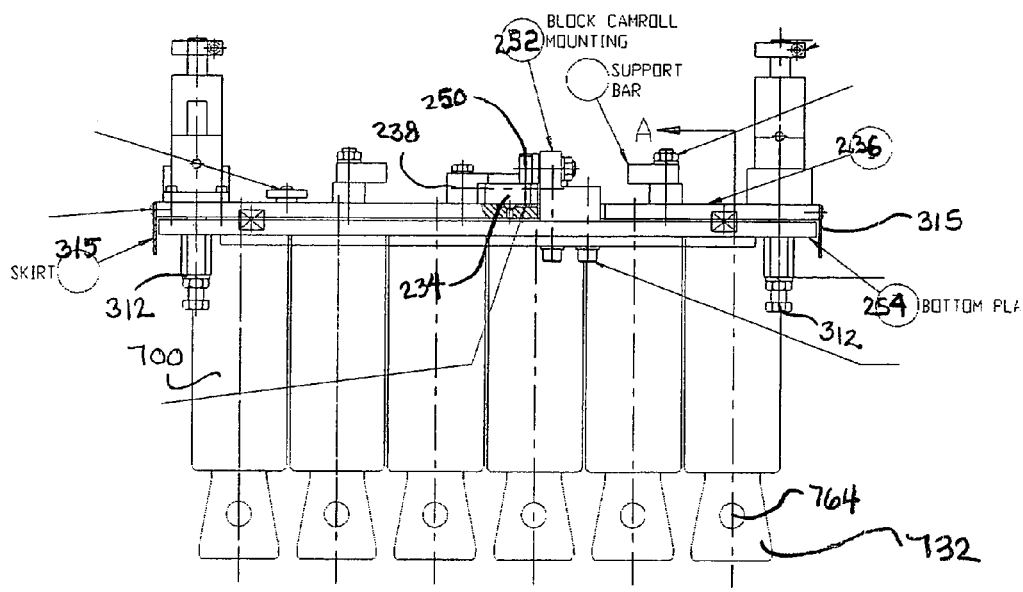
FIG. 25 is a front elevation view of the gripper head assembly and gripper head assembly frame of FIG. 23 with the grippers shown in an open configuration.
Figure 26:
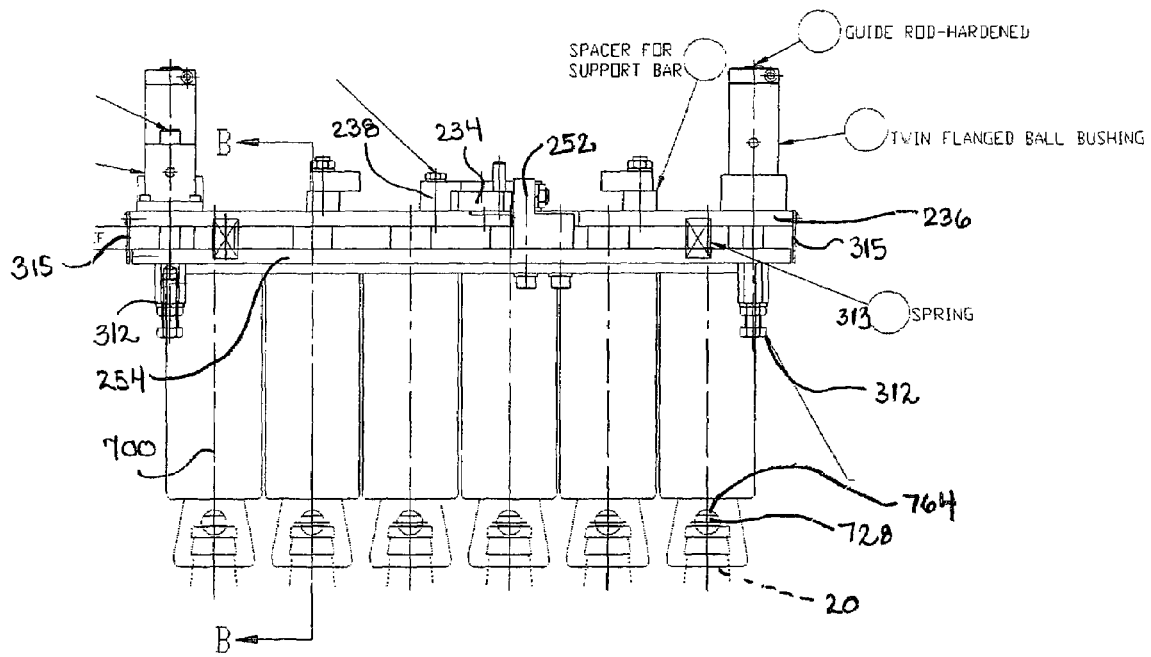
FIG. 26 is a front elevation view of the gripper head assembly and gripper head assembly frame of FIG. 23 with the grippers shown in a closed configuration; and, FIG. 27 is a top cross-sectional view of the gripper head assembly, gripper head assembly frame, and first cam piece of FIG. 21.
Figure 27:
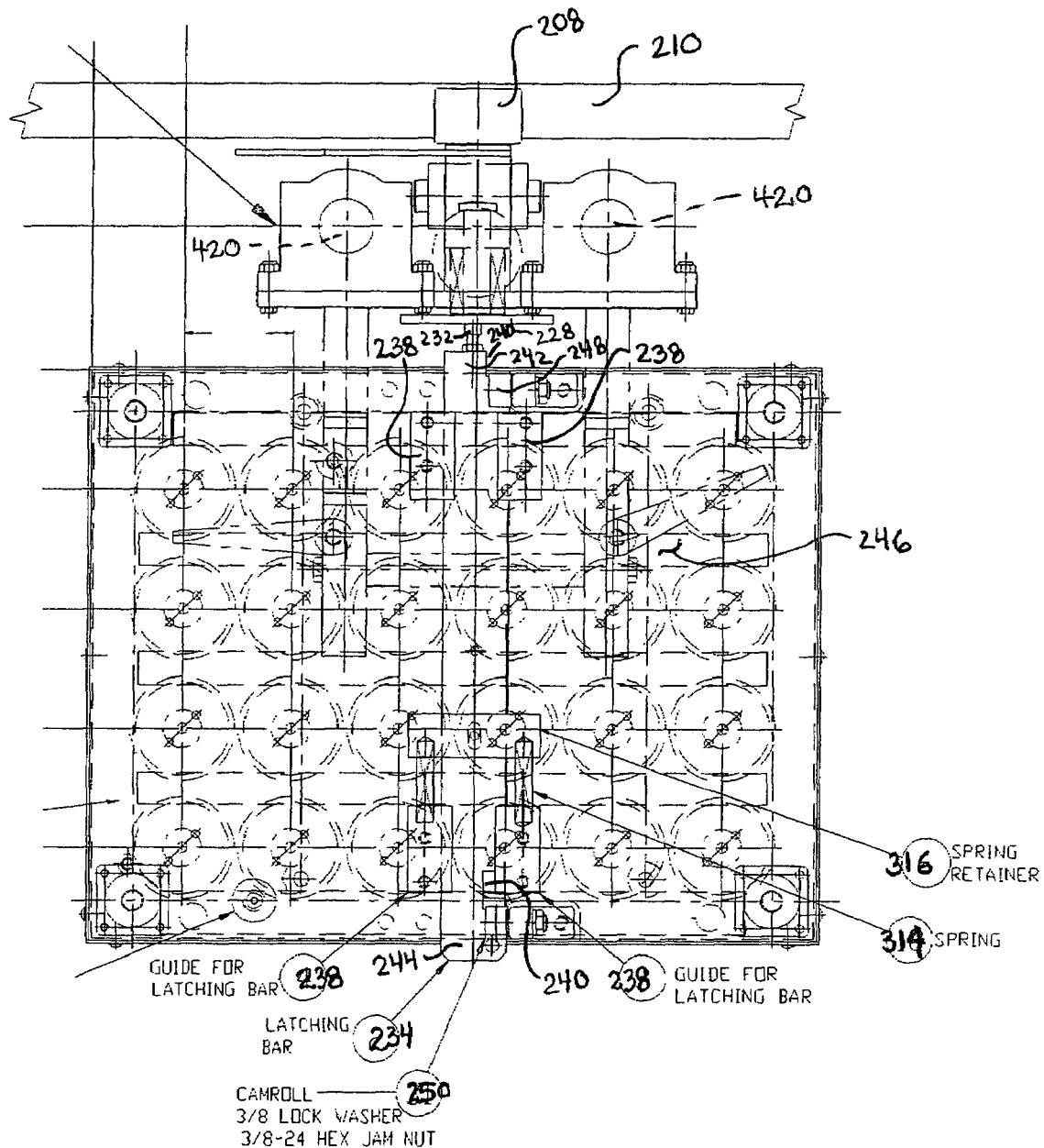

The gripper 700 includes a gripper post 722 that is attached at a first end 724 to the first plate 236. The second end 726 of the gripper post 722 includes a cushion grommet 728. A post stud 730 passes through a central bore of the gripper post 722 for retaining the gripper post 722 to the first plate 236. A pair of gripper jaws 732 is attached to the gripper post 722 at jaw springs 734, and pivotal with respect to the gripper post 722 at pivot 735. The springs 734 bias the jaws 732 in the closed position for ensuring that the gripper 700 retains the product head within its grabber during product packaging, even if the cam ring 720 is worn down from use. Each gripper jaw 732 includes a cam end 736 and a product-engaging end 738. The cam end 736 is adjacent a first end 740 of the jaws 732, and the product engaging end 738 is adjacent a second end 742 of the jaws 732. The cam end 736 includes cam ring engaging surfaces that serve to open and close the jaws 732. The cam ring engaging surfaces at the cam end 736 includes a cam opening surface 744 that is adjacent the first end 740 of the jaws 732. Adjacent the cam opening surface 744 is a cam connector 746 that extends from the cam opening surface 744 to a cam closing surface 748. When inside the cam support 702, the cam end 736 is shaped such that the cam opening surface 744 and cam closing surface 748 angle towards inner walls of the cam support 702. In a cross-sectional view as shown in FIGS. 18-19, it appears that the cam end 736 has an hour-glass shape. At the product-engaging end 738, the jaws have a trapezoidal shape with its widest portion adjacent the second end 742, as shown in FIGS. 25-26. Each jaw 732 includes a window 764 that allows an operator to view the insertion of a head of a product within the gripper when the gripper is in the closed position, such as in FIG. 26. The windows 764 allow for visibility of the product 20 when gripped by a gripper head assembly 200 to ensure proper engagement within the gripper 700.

The product engaging end 738 of each jaw 732 includes a pair angled surfaces 750 for engaging product 20, as most clearly shown in FIGS. 20-21. When a product is fully captured within the jaws 732 as shown in FIG. 20 with the jaws in a closed position, the product head will be centered between opposing central areas 751 that are positioned between each pair of angled surfaces 750. In an ideal situation, each gripper 700 will have a longitudinal axis perfectly aligned with a longitudinal axis of the product 20 to be gripped. In reality, it is possible that each product 20 will not be perfectly aligned prior to gripping, and therefore the shape of the angled surfaces 750 naturally guide a product to the longitudinal center location 749 with the ends 760 of the angled surfaces 750 and the product engaging guide surfaces 762 gently abutting product heads and guiding a product 20 to be located at center location 749 as the jaws 732 move from the open position to the closed position. It is noted that this method of product re-alignment is more gentle than a grabber which slams itself on top of the product, where the slam is used to realign the product, such as the frustoconical shape 658 of gripper 600. Because the angled surfaces 750 engage a side of the product 20 instead of a head, a product seal (such as a bottle cap) is not disturbed during the alignment process.

In use, when the second plate 254 is positioned adjacent the first plate 236, the cam opening surface 744 of the jaws abuts the cam ring 720 to pivot the jaws 732 such that the product engaging surfaces 738 are distanced apart. When the second plate 254 is separated from the first plate 236, the cam support 702 moves in a direction x towards the second end 742 of the jaws 732 such that the cam ring 720 slides over past the cam opening surface 744 and over the cam closing surface 748. When the cam ring 720 is pressed against the cam closing surfaces 748, the product engaging ends 738 of the jaws 732 are forced together to retain a product head there between.

Thus, grippers have been described that utilize a tube (as illustrated), or any other support member capable of supporting a cam, that is movable towards or away from an end of the grabber to actuate the same. It should also be appreciated that the cam support, which has been illustrated as a tube, could be substituted by a linkage system (such as 4-bar linkages, slider crank mechanisms, bell crank, etc.) to function similarly to that described herein. As the tube moves towards the end of the grabber, the grabber closes, thus enabling the gripper to enclose at least a portion of a product therein. As the tube moves away from the end of the grabber, the grabber opens, thus enabling the grabber to release any product previously retained therein. The opening and closing movements of the grabber is accomplished using a cam surface positioned within an interior of the tube. While the grabber has been specifically described as utilizing jaws within grippers 600 and 700, it should be understood that any grabber would be within the scope of the grippers for the gripper head assembly, such as, but not limited to, a grabber made of a deformable material, a grabber with one pivotal jaw and one stationary jaw, grabber with a single collet, inflatable grabber, etc.

Turning now to FIGS. 23-27, while the grippers shown for the gripper head assemblies 200 are the grippers 700 from FIGS. 18-19, it should be understood that any suitable gripper may be utilized with the gripper head assemblies 200, including, but not limited to, grippers 600. Grippers may be removably attached to the gripper head assemblies 200 for repair, replacement, or reconfiguration.

As previously described with respect to the plate separating bump 214 on the first cam piece 210 of the cam device 202 for the gripper head assemblies 200, the gripper assembly frame 204 is provided with a plate separating roller 218 (FIGS. 23-24) that rolls over the bump 214. A rotational axis 220 of the plate separating roller 218 is nearly perpendicular to a rotational axis 222 of the cam roller 208, although the rotational axis 220 pivots as the roller 218 is provided on a pivoting member 224. The plate separating roller 218 extends from the gripper head assembly frame 204 in a position located between the slide bars 420 that the gripper head assembly 200 slides up and down upon. As the plate separating roller 218 rolls over the plate separating bump 214, pivoting member 224, upon which the plate separating roller 218 is attached, moves towards and against one end of a push rod 226 which is attached at a second end of the push rod 226 to a disk 228 that that also hangs down from the gripper assembly frame 204. That is, the push rod 226 passes through a flange 230 of the frame 204, through which the push rod 226 moves either toward or away from the gripper head assembly 200, and either towards or away from the cam track 202. The disk 230 thus moves towards the gripper head assembly 200 hanging on the gripper assembly frame 204 when the plate separating roller 218 rolls over the plate separating bump 214. As the disk 230 moves towards the gripper head assembly 200, a pusher knob 232 provided on the disk 230 pushes a latching bar 234.

Figure 24:
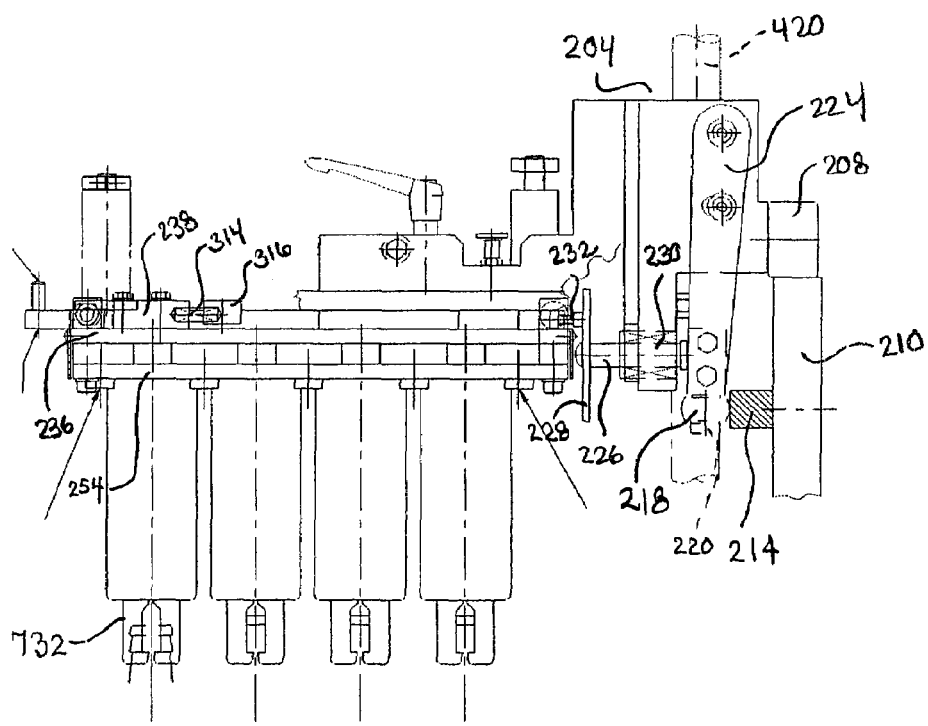
FIG. 24 is a side elevation, and partial cross-sectional view of the gripper head assembly, gripper head assembly frame, and first cam piece for the gripper head assembly of FIG. 23 with the gripper shown in a closed configuration.

The latching bar 234 (FIGS. 25-27) is located on the gripper head assembly 200 with respect to a first plate 236 of the gripper head assembly 200 and slidable within guides 238 that is positioned on longitudinal sides of the latching bar 234. Notches 240 are provided adjacent first and second ends 242, 244 of the latching bar 234. When the pusher knob 232 pushes the first end 242 of the latching bar 234, the latching bar 234 slides across the top surface 246 of the first plate 236 and first and second rollers 248, 250 positioned on the latching bar 234 fall into the notches 240 formed into the bar 234. The rollers 248, 250 are connected via block camroll mountings 252 (one for each roller 248, 250) to the second plate 254, so as the rollers 248, 250 fall into the notches 240, the second plate 254 separates from the first plate 236. Springs 313 are stretched when the second plate 254 separates from the first plate 236, and recompressed when the second plate 254 is pushed back towards the first plate 236. Skirts 315 are attached to the first plate 236 and serve to hide and protect the space between the first plate 236 and second plate 254 when the plates 236, 254 are separated as shown in FIG. 24. When the second plate 254 separates from the first plate 236, the jaws of the collet assembly within the grippers of the gripper head assembly 200 close, thereby capturing product heads within the grippers. Thus, as the gripper head assembly frame 204 moves over the plate separating bump 214 on the cam device 202, the product 20 is gripped within the gripper head assembly 200. After the gripper head assembly frame moves past the plate separating bump 214, the plate separating roller 218 is not needed again until it returns on another trip around the carousel 400 to the first cam piece again and again engages the plate separating bump 214.

While a specific arrangement has been described for separating the plates 236, 254 and for re-engaging the plates 236, 254, it should be understood that alternate separating and re-registering arrangements would be within the scope of the gripper head assembly. Furthermore, while plates 236, 254 have been described as holding the cam tube and grabber in closed and open positions, any support, including but not limited to plates, that can hold the gripper and move a grabber in open and closed positions would be within the scope of the gripper head assembly. Such a support could alternately be constructed of a web, linkage, magnetic support, etc.

Thus, a packaging machine 10 has been described that includes grid assemblies 300 that are positionable underneath product 20 and underneath gripper head assemblies 200. As product 20 moves through grouper section 14, gripper head assembly 200 and grid assembly 300 swing around to prepare for receiving product 20. Gripper head assembly 200 swings over product 20 and grid assembly 300 swings under product 20. Via the gripper head assembly cam device 202, gripper head assembly 200 then comes down and grips the top of product 20 and slightly lifts product 20 off of the surface in the grouper section 14. The top of a grid rib of the grid assembly 300 comes to bottom of lane guide so that the heel of the product 20 is guided into the fingers 310 of the grid assembly 300. Grid assembly 300 comes from underneath and gripper head assembly 200 lowers product through grid assembly 300. Both gripper head assembly 200 and grid assembly 300 move as a unit down to a case 12 and grippers 600/700 then release the product 20 into the case 12, and the case 12 continues its travel down the case feed section 18.

The automated cam device 202 and case feed 18 adjusting assemblies 500, 800 allow for a quick change over that is transparent to the operator. It is also a repeatable and accurate movement of the two assemblies. The area of a jam opens up and allows for the operator to remove the problem and product size changes can quickly be accommodated. The controller of the packaging machine allows for automatic adjustments of the gripper head assemblies and case feed for jam clearing or product height or case height changes.

A packaging machine for packaging a product, the packaging machine comprising a lane for moving product; a driven chain within the lane; a lug pivotally attached to the chain and carried by the chain through the lane; and, a cam surface positioned within the lane; wherein, when the lug moves by the cam surface, the lug is pivoted into the lane to engage with product moving in the lane.

The packaging described in paragraph 90 wherein the lug includes a pivot hole for pivotally attaching the lug to the chain and a radial groove, wherein a pin connected to the chain passes through the radial groove, wherein the radial groove provides a path for pivoting the lug with respect to the chain.

The packaging described in paragraph 90 wherein the cam surface includes a lug engaging end that pivots the lug from a non-engaged position below the chain and lane to an engaged position above the chain and within the lane, and wherein the cam surface further includes a raised surface that is positioned within the lane for preventing product from contacting the chain, wherein the product is pushed along the raised surface by the lug.

The packaging described in paragraph 90 further comprising a plurality of lane guides and a plurality of lanes, each lane defined between an adjacent pair of lane guides, each lane including at least one chain, wherein each of the at least one chain includes a lug and a cam surface.

The packaging machine described in paragraph 93 further comprising a plurality of lugs evenly spaced along a length of the at least one chain in each lane, wherein each lug eliminates unwanted spacing between product in a product set.

The packaging machine described in paragraph 94 further comprising a pair of chains in each lane, and further comprising a pair of cam surfaces in each lane, each cam surface positioned between a chain and a lane guide.

A packaging machine for packaging product, the packaging machine comprising: a case feed section for delivering cases to be packed with product; a gripper head assembly cam device; and, a selectively adjustable adjustment assembly for adjusting vertical position of one of the case feed section and the gripper head assembly cam device.

The packaging machine described in paragraph 96 further comprising a controller for operating the adjustment assembly.

The packaging machine described in paragraph 97 further comprising at least one sensor, wherein the controller automatically operates the adjustment assembly based on sensor input from the at least one sensor.

The packaging machine described in paragraph 98 wherein the sensor input includes information regarding a jam within the packaging machine.

The packaging machine described in paragraph 97 further comprising an operator interface operatively connected to the controller, wherein the operator interface accepts data related to product for packaging, wherein the controller operates the adjustment assembly based on the data.

The packaging machine described in paragraph 96 wherein the adjustment assembly includes a motor, a drive shaft, and a jack screw, wherein operation of the motor rotates the drive shaft in one of two directions for lifting or lowering one of the case feed section and the gripper head assembly cam device.

The packaging machine described in paragraph 101 further comprising a sensor for detecting when a selected location has been reached by one of the case feed section and the gripper head assembly cam device.

The packaging machine described in paragraph 102 further comprising a sensor adjacent the drive shaft for counting rotations of the drive shaft, wherein the jack screw is adjusted by counting rotations of the drive shaft from the selected location of one of the case feed section and the gripper head assembly cam device.

The packaging machine described in paragraph 103 wherein the adjustment assembly adjusts a vertical position of the gripper head assembly cam device, wherein the adjustment assembly includes a pair of jack screws attached to the gripper head assembly cam device, the drive shaft connecting the pair of jack screws for operating the pair of jack screws simultaneously with the motor.

The packaging machine described in paragraph 103 wherein the adjustment assembly adjusts a vertical position of the case feed section, and wherein the adjustment assembly includes two pairs of jack screws attached to the case feed section, each pair of jack screws connected by a drive shaft, each drive shaft driven simultaneously by the motor.

The packaging machine described in paragraph 103 wherein the adjustment assembly adjusts a vertical position of the gripper head assembly cam device, and wherein the adjustment assembly further includes a gripper head assembly jam detecting sensor for sensing a displacement of a gripper head assembly jam detection cam, wherein the adjustment assembly moves the gripper head assembly cam device for jam clearance.

The packaging machine described in paragraph 96 wherein the adjustment assembly adjusts a vertical position of the gripper head assembly cam device, wherein the gripper head assembly cam device includes a first cam piece and a second cam piece having a first end and a second end, wherein the second cam piece is pivotally attached at a pivot point to the first cam piece adjacent the first end of the second cam piece, and wherein the second end of the second cam piece includes a slot, wherein a stationary pin extending from a fixed element within the packaging machine extends within the slot, wherein, upon vertical adjustment of the gripper head assembly cam device using the adjustment assembly, the second cam piece pivots about the pivot point and the slot moves with respect to the pin for maintaining a smooth curve between the first cam piece and the second cam piece.

The packaging machine described in paragraph 107 further comprising a grid assembly fixed cam surface, wherein a gripper head assembly rolling on the gripper head assembly cam device rolls off of the second cam piece and directly onto a grid assembly at any adjusted location of the gripper head assembly cam device, where the grid assembly is traveling on a grid assembly fixed cam surface.

The packaging machine described in paragraph 96 further comprising a grid assembly fixed cam surface for travel of a grid assembly, the grid assembly fixed cam surface positioned between the gripper head assembly cam device and the case feed section, and further comprising an adjustment assembly for each of the gripper head assembly cam device and the case feed section.

A gripper head assembly for a packaging machine, the gripper head assembly comprising: a gripper, the gripper including a cam support and a grabber, wherein an interior of the cam support includes a cam surface, and wherein the grabber includes a first end, a second end, a cam engaging surface between the first end and the second end, and a product engaging surface adjacent the second end; wherein, when the cam support moves away from the second end of the grabber, the grabber is moved to an open configuration corresponding to a first position of the gripper head assembly and, when the cam support moves towards the second end of the grabber, the grabber is moved towards a closed configuration corresponding to a second position of the gripper head assembly.

The gripper head assembly described in paragraph 110 further comprising a rod having a first end and a second end, wherein the second end of the rod is attached to the grabber, and wherein the grabber articulates relative to the rod.

The gripper head assembly described in paragraph 111 further comprising a first support, wherein the first end of the rod is attached to the first support, and further comprising a second support, wherein the cam support is attached to the second support, wherein, when the second support is moved towards the first support, the gripper head assembly is in the first position, and wherein, when the second support is moved away from the first support, the gripper head assembly is in the second position.

The gripper head assembly described in paragraph 112 wherein the first support and the second support are separable using a separation assembly associated with the first support and the second support, wherein operation of the separation assembly serves to separate the second support from the first support for placing the gripper head assembly in the second position.

The gripper head assembly described in paragraph 113 wherein the separation assembly is engaged to separate the second support from the first support by a separation assembly engagement device associated with a gripper head assembly frame.

The gripper head assembly described in paragraph 114 wherein the second support includes at least one depending support closing element, wherein, when the gripper head assembly rests upon a grid assembly within a packaging machine, the at least one depending support closing element abuts the grid assembly and pushes the second support towards the first support for returning the gripper head assembly to the first position.

The gripper head assembly described in paragraph 115 wherein the separation assembly includes a latching mechanism to retain the gripper head assembly in the first position until the separation assembly is engaged by the separation assembly engagement device.

The gripper head assembly described in paragraph 112 further comprising a plurality of grippers, each including a cam support attached to the second support and a rod attached to the first support.

The gripper head assembly described in paragraph 111 of wherein the grabber includes at least one pivotal jaw.

The gripper head assembly described in paragraph 111 wherein the grabber includes a pair of jaws, and wherein the pair of jaws are pivotal with respect to the rod and are spring biased to the second position.

The gripper head assembly described in paragraph 119 wherein each jaw includes a pair of angled product-engaging faces for guiding misaligned product to alignment with a longitudinal axis of the gripper, wherein the product engaging faces engage a side of the product.

The gripper head assembly described in paragraph 110 wherein the cam surface is toollessly removable.

The gripper head assembly described in paragraph 121 wherein the cam surface is a cam ring, wherein a ring engaging end of the cam support includes an interruptive portion alignable with an interruptive portion on the cam ring, wherein, when the interruptive portions are aligned, the cam ring is removable and insertable within the cam support, and when the cam ring is rotated within the cam support for misaligning the interruptive portions, the cam ring is retained within the cam support.

The gripper head assembly described in paragraph 110 wherein the grabber has a window for providing visibility of product engaged within the grabber.

The gripper head assembly described in paragraph 110 wherein the grabber has an hour-glass cross-sectional shape in the area of the cam engaging surface.

The gripper head assembly described in paragraph 110 wherein the cam engaging surface includes a cam opening surface, a cam closing surface, and a cam connector connecting the cam opening surface to the cam closing surface, wherein the cam surface of the cam tube abuts the cam opening surface in the first position of the gripper head assembly, and wherein the cam surface of the cam tube abuts the cam closing surface in the second position of the gripper head assembly.

A packaging machine for packaging a product, the packaging machine comprising a dual servo grouper for separating product traveling in lanes in a grouper section of the packaging machine into product sets, wherein the dual servo grouper includes: a first chain; a first bar attached to the first chain; a first pin attached to the first bar; a second chain; a second bar attached to the second chain; a second pin attached to the second bar; a first servomotor having a first drive shaft for driving the first chain; a second servomotor having a second drive shaft for driving the second chain; and, a conveyor chain moving at feed speed; wherein the first chain and the second chain are alternatingly accelerated and decelerated to move the first pin and the second pin within a lane of the packaging machine at different speeds, wherein a downstream pin inserted adjacent the conveyor chain allows product riding on the conveyor chain to accelerate until the product reaches feed speed.

The packaging machine described in paragraph 126 further comprising a pair of bars attached to the first chain and a pair of bars attached to the second chain, each bar including a pin for entering the lane of the packaging machine to separate equally sized product sets.

The packaging machine described in paragraph 127 further comprising a plurality of lanes in the packaging machine and a plurality of pins positioned on each bar, wherein at least one pin enters each lane during product set separation.

The packaging machine described in paragraph 126 further comprising a lane for product travel, the lane including the conveyor chain for carrying product through the grouper section, the conveyor chain moving at feed speed, wherein, when the first pin enters the lane via the first chain moving the first pin into the lane, the first pin prevents a first product set from moving along the conveyor chain at feed speed, and wherein, when the second pin enters the lane via the second chain moving the second pin into the lane, the second pin prevents a second product set from moving along the conveyor chain at feed speed while the first pin accelerates to bring the first product set to feed speed.

A packaging machine for packaging a product, the packaging machine comprising: a plurality of lane guides; at least one lane for moving product, each lane defined between an adjacent pair of lane guides; at least one chain within each of the at least one lane, each of the at least one chain attached to one of the plurality of lane guides; and, wherein the plurality of lane guides are movable to alter a width of each lane.

The packaging machine described in paragraph 130, further comprising: a drive shaft for driving the at least one chain within each lane, the drive shaft having a longitudinal axis; and, a drive sprocket for each chain; wherein the drive sprocket for each chain is slidable about the longitudinal axis of the drive shaft for moving with the chain when the plurality of lane guides are moved.

The packaging machine described in paragraph 131 wherein the drive shaft is a slidable geometric drive shaped shaft, and the drive sprocket for each chain has a complementarily shaped opening for sliding upon the drive shaft.

The packaging machine described in paragraph 130 wherein the at least one chain is a first chain and a second chain within each lane, wherein the first chain is attached to one of the plurality of lane guides, and the second chain is attached to another of the plurality of lane guides.

The packaging machine of claim described in paragraph 130 further comprising a chain tensioner having chain tensioning elements attached to the lane guides, wherein movement of the lane guides simultaneously moves the chain tensioning elements.

The packaging machine described in paragraph 130 further comprising chain carrying elements attached to the plurality of lane guides, wherein the at least one chain within each lane rides upon the chain carrying elements during operation of the packaging machine, and wherein the at least one chain within each lane moves with the chain carrying elements when the lane guides are moved.

The packaging machine described in paragraph 130 wherein the plurality of lane guides are movable manually to alter width dimensions of each lane.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A continuous motion packaging machine for packaging product, the packaging machine comprising:
   a grid assembly having fingers capable of guiding the product into a case;
   a case feed section capable of delivering cases to be packaged with product;
   a grid cam system in operable communication with the grid assembly such that the grid assembly moves in a single direction relative to product being packaged by the machine during engagement of the grid assembly with the product being packaged; and
   a gripper head assembly capable of gripping the product to be packaged and a gripper head assembly cam device in operable communication with the gripper head assembly such that the gripper head assembly cam device delivers the gripper head assembly above a product set to be packaged, and the gripper head assembly cam device includes a first cam piece upon which the gripper head assembly rolls and engages with a product set, the first cam piece including a lowering ramp for converging the gripper head assembly with the grid assembly, and the gripper head assembly cam device includes a second cam piece pivotally attached to the first cam piece, wherein the gripper head assembly rolls off of the second cam piece and onto the grid assembly.

2. The packaging machine of claim 1 wherein the grid assembly includes a first side facing the gripper head assembly and a second side, a plurality of fingers depending from the second side, wherein the product to be packaged does not pass through the grid assembly in a direction from the second side to the first side.

3. The packaging machine of claim 1 wherein the grid cam system delivers the grid assembly below a product set to be packaged.

4. A continuous motion packaging machine for packaging product, the packaging machine comprising:
   a grid assembly having fingers capable of guiding the product into a case;
   a case feed section capable of delivering cases to be packaged with product;
   a grid cam system in operable communication with the grid assembly such that the grid assembly moves in a single direction relative to product being packaged by the machine during engagement of the grid assembly with the product being packaged; and
   a gripper head assembly capable of gripping the product to be packaged and a gripper head assembly cam device in operable communication with the gripper head assembly such that the gripper head assembly cam device delivers the gripper head assembly above a product set to be packaged and the gripper head assembly cam device includes a first cam piece having a product grabbing area where a product set to be packaged is gripped by the gripper head assembly, and an incline bump, wherein the incline bump on the first cam piece lifts the product set off of rails that lead the product set from a grouper section to a gripper/grid section of the packaging machine.

5. The packaging machine of claim 1 wherein the grid cam system includes a first ramp incline surface, a leveling surface, a ramp decline surface, a packaging area, and a second ramp incline surface, and the grid assembly is travelable on the first ramp incline surface to arrive underneath a product set at the leveling surface, and the product set is movable through the grid assembly by the gripper assembly and fingers of the grid assembly enter into a case fed from the case feed section as the grid assembly travels down the ramp decline surface, and after the product set is fully set into the case, the grid assembly carries the gripper head assembly up the second ramp incline surface to separate the grid assembly and gripper head assembly from the case.

6. The packaging machine of claim 1 wherein the grid cam system includes a ramp incline, wherein, after the gripper head assembly rolls off of the second cam piece and onto the grid assembly, the grid assembly carries the gripper head assembly up the ramp incline and away from a case that has been packed.

7. The packaging machine of claim 1 including a converging side where the gripper head assembly and the grid assembly are brought together for packaging a product set, and a separating side where the gripper head assembly and grid assembly are separated for a return trip to the converging side.

8. The packaging machine of claim 7 wherein the gripper head assembly cam device includes a return cam on the separating side of the packaging machine, wherein a gripper head assembly frame roller engages with the return cam and the gripper head assembly travels up the return cam for positioning itself back on the converging side above a product set, and wherein the grid cam system includes a returning ramp decline surface on the separating side of the packaging machine, wherein the grid assembly rolls down the decline surface for positioning itself back on the converging side below a product set.

9. A continuous motion packaging machine for packaging product, the packaging machine comprising:
   a grid assembly having fingers capable of guiding the product into a case;
   a case feed section capable of delivering cases to be packaged with product;
   a grid cam system in operable communication with the grid assembly such that the grid assembly moves in a single direction relative to product being packaged by the machine during engagement of the grid assembly with the product being packaged;
   a gripper head assembly capable of gripping the product to be packaged and a gripper head assembly cam device in operable communication with the gripper head assembly such that the gripper head assembly cam device delivers the gripper head assembly above a product set to be packaged wherein the gripper head assembly cam device for defining a travel path of the gripper head assembly includes a first cam piece having a gripper closing engagement device, wherein, when the gripper head assembly passes by the gripper closing engagement device, grippers attached to the gripper head assembly close onto product; and
   a drive shaft, a chain driven by the drive shaft, and a slide bar parallel with the drive shaft and connected to the chain for travel with the chain, wherein the gripper head assembly and the grid assembly are both slidably connected to the slide bar for travel with the chain, and wherein the grid assembly is positioned below the gripper head assembly.

10. The packaging machine of claim 9 further comprising a gripper head assembly frame having a rapid attachment/detachment arrangement for the gripper head assembly.

* * * * *